(12) United States Patent
Brumbaugh et al.

(10) Patent No.: US 11,285,695 B2
(45) Date of Patent: Mar. 29, 2022

(54) PACKAGING CONTAINER WITH RECLOSABLE LID AND LABEL

(71) Applicant: Avery Dennison Corporation, Glendale, CA (US)

(72) Inventors: Gregory P. Brumbaugh, Hudson, OH (US); Scott S. Super, Greensboro, NC (US); Yijun Ye, Solon, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/995,234

(22) Filed: Jun. 1, 2018

(65) Prior Publication Data
US 2018/0346222 A1 Dec. 6, 2018

Related U.S. Application Data

(60) Provisional application No. 62/516,025, filed on Jun. 6, 2017.

(51) Int. Cl.
*B32B 7/04* (2019.01)
*B65D 77/20* (2006.01)
(Continued)

(52) U.S. Cl.
CPC ............... *B32B 7/04* (2013.01); *B32B 37/26* (2013.01); *B65D 65/14* (2013.01);
(Continued)

(58) Field of Classification Search
CPC ...... B65D 77/00–77/40; B65D 65/00–65/466; B32B 7/06; B32B 27/00–27/27
See application file for complete search history.

(56) References Cited

U.S. PATENT DOCUMENTS 5,908,209 A * 6/1999 Carides ................ G09F 3/0288
283/81
5,958,534 A * 9/1999 Marbler ................ B32B 27/08
428/36.6
(Continued)

FOREIGN PATENT DOCUMENTS

CN 102448846 5/2012
WO 2010/114879 10/2010
(Continued)

OTHER PUBLICATIONS

Product Datasheet: Vistamaxx(TM) Performance Polymer 3588FL. ExxonMobil Chemical, (2017); pp. 1-2.*
(Continued)

*Primary Examiner* — Prashant J Khatri
(74) *Attorney, Agent, or Firm* — Avery Dennison Corporation

(57) ABSTRACT

The present subject matter relates to a label lid for sealing an opening in a packaging container. The label comprises a facestock layer, a removable adhesive layer, a heat-seal layer, and an optional release coating, wherein the removable adhesive layer does not include a release liner. The removable adhesive layer can be coated on the heat-seal layer or the facestock layer. Optionally, a release coating can be applied to the heat-seal layer or the facestock layer. The composition of the layers used in specific arrangements provides unique performance characteristics for the label for improved sealing, reclosure, and matrix stripping properties.

17 Claims, 17 Drawing Sheets

(51) Int. Cl.
   *B65D 65/14* (2006.01)
   *B65D 75/58* (2006.01)
   *B32B 37/26* (2006.01)
   *B32B 27/30* (2006.01)
   *B65D 65/40* (2006.01)
   *B65C 3/06* (2006.01)
   *B32B 37/12* (2006.01)

(52) U.S. Cl.
   CPC ..... *B65D 75/5855* (2013.01); *B65D 77/2056* (2013.01); *B65D 77/2096* (2013.01); *B32B 27/304* (2013.01); *B32B 37/12* (2013.01); *B32B 2250/24* (2013.01); *B32B 2307/31* (2013.01); *B32B 2439/70* (2013.01); *B65C 3/06* (2013.01); *B65D 65/40* (2013.01); *B65D 2575/586* (2013.01); *B65D 2577/2091* (2013.01)

(56) References Cited

U.S. PATENT DOCUMENTS

| | | | |
|---|---|---|---|
| 6,818,271 B2 | 11/2004 | Fearn et al. | |
| 7,411,020 B2 * | 8/2008 | Carlson | C09D 133/02 523/201 |
| 7,592,057 B2 | 9/2009 | Dronzek, Jr. et al. | |
| 7,717,620 B2 | 5/2010 | Hebert et al. | |
| 8,201,385 B2 | 6/2012 | McLean | |
| 8,262,830 B2 | 9/2012 | Hebert et al. | |
| 8,262,832 B2 | 9/2012 | Hebert et al. | |
| 8,283,010 B2 * | 10/2012 | Cruz | B32B 7/10 428/40.1 |
| 8,354,132 B2 | 1/2013 | Stephens et al. | |
| 8,545,099 B2 | 10/2013 | Davis et al. | |
| 2009/0226117 A1 | 9/2009 | Davis et al. | |
| 2010/0002963 A1 | 1/2010 | Holbert et al. | |
| 2012/0067896 A1 * | 3/2012 | Daffner | B65D 77/2056 220/359.3 |
| 2013/0020328 A1 | 1/2013 | Duan et al. | |
| 2013/0055682 A1 | 3/2013 | Benedetti et al. | |
| 2013/0056470 A1 * | 3/2013 | Hallak | B65D 75/5855 220/270 |
| 2016/0122109 A1 | 5/2016 | Clark et al. | |
| 2017/0036836 A1 | 2/2017 | Hebert et al. | |

FOREIGN PATENT DOCUMENTS

| | | | |
|---|---|---|---|
| WO | 2011/032064 | 3/2011 | |
| WO | 2011/123410 | 10/2011 | |
| WO | 2012/036765 | 3/2012 | |
| WO | WO-2015189756 A1 * | 12/2015 | ......... B32B 38/0004 |
| WO | 2016/057046 | 4/2016 | |
| WO | WO-2016083521 A * | 6/2016 | ................ C08J 5/18 |
| WO | WO-2016133904 A1 * | 8/2016 | ............ B32B 27/08 |
| WO | 2018/145257 | 8/2018 | |
| WO | 2018/184198 | 10/2018 | |

OTHER PUBLICATIONS

Invitation to Pay Additional Fees dated Aug. 24, 2018 issued in corresponding IA No. PCT/US2018/035531.
International Search Report dated Oct. 15, 2018 issued in corresponding IA No. PCT/US2018/035531.
Written Opinion dated Oct. 15, 2018 issued in corresponding IA No. PCT/US2018/035531.

* cited by examiner

PACKAGING CONTAINER WITH RECLOSABLE LID AND LABEL

CROSS-REFERENCE TO RELATED APPLICATION

The present application claims priority to U.S. Provisional Application No. 62/516,025 filed Jun. 6, 2017, which is incorporated herein by reference in the entirety.

FIELD

The present disclosure generally relates to labels for sealing containers, e.g., food packaging. In particular, the present disclosure relates to labels for sealing containers that include a molded or shaped tray defining a cavity, and a related process for making the label.

BACKGROUND

Many different types of packaging containers are well known. Some of these packaging containers have a two-piece construction including a molded base or tray and a lidding film. The molded base or tray has a recessed portion defining a product-receiving cavity and the lidding film is attached to the base or tray to cover the cavity and seal the contents of the tray. Commonly, these containers are used in restaurants and cafes to hold unit servings of food products, e.g., jelly, honey, and butter. The containers are also used in the food service industry for packaging and storing fruits and vegetables for later consumption.

Typically, the lidding film, e.g., a label, is sealed to a flange portion of the tray that surrounds the cavity. In order to separate the lidding film from the tray, the tray is scored at one corner of the flange to define a small frangible corner piece. When opening the package, the user grasps the corner piece and the portion of the lidding film attached to the corner piece, and breaks the corner piece from the remainder of the tray. The lidding film can then be peeled apart from the flange with a smooth pulling motion while still grasping the small corner piece and the corresponding corner of the lidding film. During this process, the lidding film appears to remain intact with no rips or tears, and the small corner piece of the tray remains attached to the lidding film.

Another type of packaging container is disclosed in WO 2016/057046, which relates to a package for the storage of food or other suitable products including a tray and, optionally, a lidding film. The tray is thermoformed, molded, or otherwise shaped to provide a recessed portion and flange, the recessed portion defining a product-receiving cavity. The flange includes a frame portion surrounding the cavity and a margin portion disposed alongside the frame portion and, in some embodiments, extending substantially a full width of the tray. The optional lidding film attaches to both the frame and margin portions and typically seals the cavity. The margin portion and a side wall of the recessed portion may include locking features to allow the margin portion to snap close against the side wall. The package may then be made to stand on end with the margin portion acting as a base. The lidding film may include a peelable/resealable film to allow repeated access to the product while sealing the cavity between uses.

Although conventional containers may be useful in some applications, these containers often suffer from multiple reclosure issues, e.g., inability to reopen/reclose multiple times (only one or two reclosures are possible) or tearing/splitting of the lidding material due to excessive adhesion. In addition, production of these conventional containers may entail several process steps to form the reclosable lidding material, which may be cost prohibitive.

Additionally, it has long been practice in the label industry to provide rolls of labels in the form of a web of liner material and a succession of labels adhered to a face of the liner material. The label is formed by die-cutting the labels from a layer of label stock, and then stripping or separating the remaining "matrix" of waste or excess label material, leaving the die-cut labels adhered to the liner. However, the labels and the matrix are typically guided in divergent paths. And in many applications the stripping cannot be achieved without breaking the matrix due to high adhesion, e.g., to the liner. In particular, as line speeds are increased, or more light, fragile, or flexible material are used for forming labels, e.g., for process efficiency or for improved labeling performance, the label matrix tends to break or damage more easily. This results in decreased production efficiency as well as a limited selection of materials for the label construction.

In an effort to improve matrix separation, it has been known to provide extra cuts in the matrix between the trailing and leading edges of formed labels. However, such extra cuts have been found to sever and weaken the matrix. Thus the theoretically easier matrix separation tends to be offset by easier matrix breakage, and satisfactory matrix separation is still not achieved when relatively light, fragile, or flexible materials are used. Moreover, the process of delaminating and relaminating, e.g., delaminating the labels from a matrix and relaminating the label to a liner, in conventional processes adds additional process steps and requires additional stripping of the labels.

In view of the problems associated with conventional containers and processes for forming labels used in the containers, the need exists for an improved process for making packaging containers with pressure sensitive reclosable lids constructions with improved matrix stripping, along with improved reclosability and process efficiency.

All of the references discussed throughout this application are hereby incorporated by reference.

SUMMARY

The present disclosure relates to a process for producing a label lid. The process comprises the steps of: (a) providing a facestock layer; (b) coating a removable adhesive layer to a first side of the facestock layer; and (c) laminating the first side of the facestock layer to a first side of a heat-seal layer. The removable adhesive layer does not comprise a release liner. In some embodiments, the process further includes applying a release coating to the first side of heat-seal layer before laminating step (c). In some embodiments, the peel strength to break the bond between the heat-seal layer and the removable adhesive layer may range from 100 grams/inch to 400 grams/inch. The peel strength to break the bond between the facestock layer and the removable adhesive layer may be greater than the peel strength to break the bond between the heat-seal layer and the removable adhesive layer. The peel strength to break the bond between the heat-seal layer and the release coating may be greater than the peel strength to break the bond between the heat-seal layer and the removable adhesive layer. In some embodiments, the release coating comprises one or more of silicone, fluoropolymer, polyethylene, polyolefin, polyester, polyvinyl chloride, polyvinyl fluoride, polyvinylidene difluoride, polyvinyl acetate/acrylate, modified polyurethane, polyester, wax, acrylate, acrylic, modified starch, or combinations thereof. The coat weight of the release coating in the label may range from 0.4 g/m² to 2 g/m². In some embodiments, the facestock layer comprises one or more of polyester, oriented nylon, biaxially oriented polypropylene, biaxially oriented polyethylene, polyethylene terephthalate, oriented polyethylene terephthalate, uniaxially oriented high density polyethylene, treated polyolefin, oriented polystyrene, cellophane, polylactic acid, or combinations thereof. In some aspects, the facestock layer comprises one or more of BOPP or PET, the coat weight of the release coating in the label ranges from 0.4 g/m² to 2 g/m², and the peel strength to break the bond between the heat-seal layer and the removable adhesive layer ranges from 200 grams/inch to 300 grams/inch. In some aspects, the peel strength to break the bond between the heat-seal layer and the removable adhesive layer ranges from 200 grams/inch to 300 grams/inch, the peel strength to break the bond between the facestock layer and the removable adhesive layer is greater than 400 grams/inch, and the peel strength to break the bond between the heat-seal layer and the release coating is greater than 400 grams/inch. In some embodiments, the break strength of the matrix is at least 700 kg/cm² at a production speed in a range from 50 ft/min to 300 ft/min.

In another embodiment, the present disclosure relates to a process for producing a label lid. The process comprises the steps of: (a) providing a heat-seal layer; (b) coating a removable adhesive layer to a first side of the heat-seal layer; and (c) laminating the first side of the heat-seal layer to a first side of a facestock layer. The removable adhesive layer does not comprise a release liner. In some embodiments, the process further includes applying a release coating to the first side of facestock layer before laminating step (c). The peel strength to break the bond between the facestock layer and the removable adhesive layer may range from 200 grams/inch to 300 grams/inch, the peel strength to break the bond between the heat-seal layer and the removable adhesive layer may be greater than 400 grams/inch, the peel strength to break the bond between the facestock layer and the release coating is greater than 400 grams/inch. In some embodiments, the process further includes applying a release coating to the first side of heat-seal layer before coating step (b). In some embodiments, the peel strength to break the bond between the heat-seal layer and the removable adhesive layer ranges from 200 grams/inch to 300 grams/inch, the peel strength to break the bond between the facestock layer and the removable adhesive layer is greater than 400 grams/inch, and the peel strength to break the bond between the heat-seal layer and the release coating is greater than 400 grams/inch. In some embodiments, the release coating comprises one or more of silicone, fluoropolymer, polyethylene, polyolefin, polyester, polyvinyl chloride, polyvinyl fluoride, polyvinylidene difluoride, polyvinyl acetate/acrylate, modified polyurethane, polyester, wax, acrylate, acrylic, modified starch, or combinations thereof. The coat weight of the release coating in the label may range from 0.4 g/m² to 2 g/m². In some embodiments, the facestock layer comprises one or more of polyester, oriented nylon, biaxially oriented polypropylene, biaxially oriented polyethylene, polyethylene terephthalate, oriented polyethylene terephthalate, uniaxially oriented high density polyethylene, treated polyolefin, oriented polystyrene, cellophane, polylactic acid, or combinations thereof. In some aspects, the facestock layer comprises one or more of BOPP or PET, and the coat weight of the release coating in the label ranges from 0.4 g/m² to 2 g/m². In some embodiments, the break strength of the matrix is at least 700 kg/cm² at a production speed in a range from 50 ft/min to 300 ft/min.

In another embodiment, the present disclosure relates to a label lid comprising: a heat-seal layer; a facestock layer; and a removable adhesive layer between the heat-seal layer and the facestock layer. The removable adhesive layer does not comprise a release liner. In some embodiments, the label includes a release coating sandwiched between the heat-seal layer and the removable adhesive layer. In some embodiments, the label includes a release coating sandwiched between the facestock layer and the removable adhesive layer. The heat-seal layer may comprise a base layer and a seal layer. In some aspects, the seal layer comprises an amorphous material. The thickness of the seal layer may range from 0.1 micron to 30 microns and the thickness of the base layer may range from 2 microns to 50 microns. In some aspects, the peel strength to break the bond between the heat-seal layer and the removable adhesive layer ranges from 200 grams/inch to 300 grams/inch, the peel strength to break the bond between the facestock layer and the removable adhesive layer is greater than 400 grams/inch, wherein the peel strength to break the bond between the heat-seal layer and the release coating is greater than 400 grams/inch. In some aspects, the peel strength to break the bond between the facestock layer and the removable adhesive layer ranges from 200 grams/inch to 300 grams/inch, the peel strength to break the bond between the heat-seal layer and the removable adhesive layer is greater than 400 grams/inch, wherein the peel strength to break the bond between the facestock layer and the release coating is greater than 400 grams/inch. In some aspects, the facestock layer comprises polyester having a thickness in a range from 20 μm to 50 μm, the heat-seal layer comprises polyester having a thickness in a range from 10 μm to 40 μm, the removable adhesive layer is a pressure sensitive adhesive having a thickness in a range from 10 μm to 40 μm, and the release coating has a thickness in a range from 0.5 μm to 2 μm.

In another embodiment, the present disclosure relates to a process for producing a label lid. The process comprises the steps of: (a) providing a facestock layer; (b) providing a heat-seal layer having a release coating on a first side; (c) coating a removable adhesive layer to the first side of the heat-seal layer; (d) laminating the first side of the heat-seal layer to the first side of a facestock layer; (e) die-cutting the label lid to form a plurality of labels surrounded by a matrix; and (f) stripping the matrix from the plurality of labels, wherein the removable adhesive layer does not comprise a release liner. In some embodiments, the matrix comprises the facestock layer and the removable adhesive layer.

DETAILED DESCRIPTION

Introduction

Figure 1A:
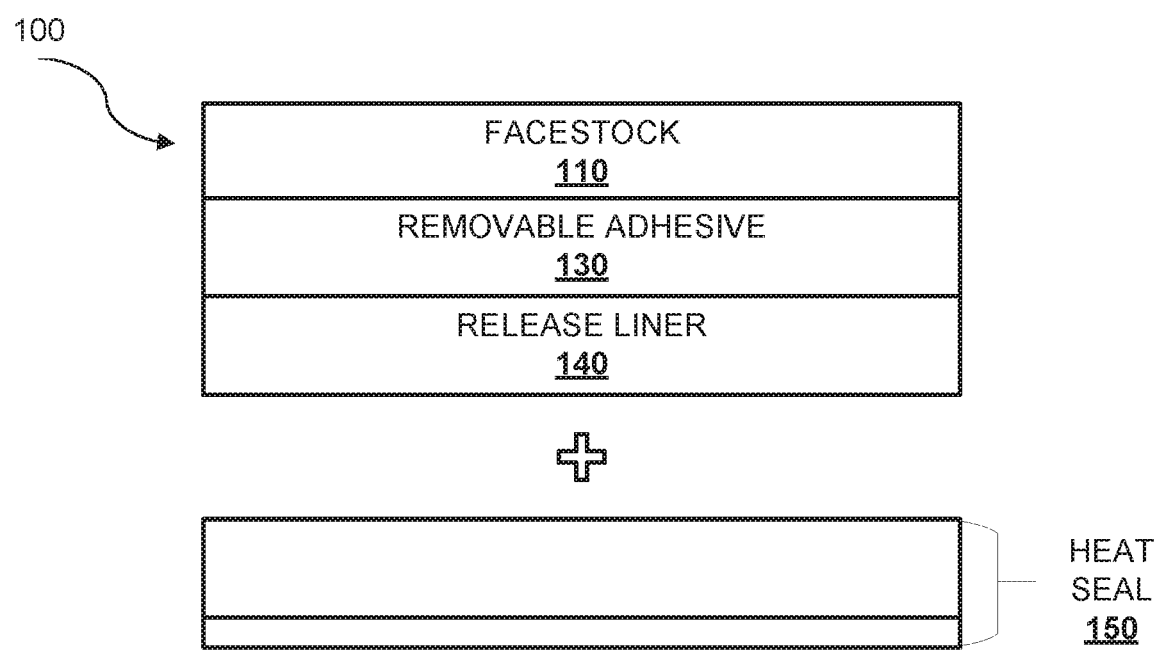
FIGS. 1A and 1B show a conventional label lid configuration that utilizes a release liner in the label.

Conventional packaging containers and processes for producing them suffer from the aforementioned deficiencies, e.g., poor matrix stripping, reclosability, and process efficiency. This disclosure, in some cases, relates to an inventive process that yields a label having a specific configuration of layers each having particular compositions. The use of these unique configurations provides for improvements in heat stability, overall process efficiency, e.g., elimination of process steps, improved matrix stripping, and improved reclosure functionality of the facestock and pressure sensitive adhesives. The disclosure also relates to the label stock and packaging containers that result from the processes.

The inventors have found that coating, e.g., directly coating, a layer of specific removable adhesive onto one side, e.g., a top side, of a specific heat-seal layer, then laminating a facestock (optionally comprising a primer) to the coated side of the heat-seal layer provides a more efficient production process as well as an improved label lid and packaging container. The inventors have also found that coating a layer of specific removable adhesive onto one side, e.g., a bottom side, of a specific facestock layer, then laminating a heat-seal layer to the coated side of the facestock layer also provides for the benefits. Optionally, a release coating can be applied to the heat-seal layer and/or the facestock layer, to improve the efficiency of the production process. In some aspects, the removable adhesive can be coated onto the release coating.

Typically, a conventional removable adhesive layer includes a release liner. The removable adhesive layer is laminated to a heat-seal layer by removing the release liner to expose the removable adhesive and then laminating the removable adhesive layer to the heat-seal layer. This operation is performed before the facestock is laminated, e.g., the removable adhesive layer is not coated. In this case, the release liner must first be removed from the removable adhesive layer, which creates significant process inefficiencies. By coating the specific removable adhesive layer onto the heat-seal layer or the facestock layer, the step of removing the release liner is eliminated.

In addition to the process efficiency benefits, the use of the unique layers discussed herein provides for improvements in heat stability, e.g., it provides for a tailored heat-seal temperature range (based on the thickness and composition of the heat-seal layer). Also, because the specific removable adhesive layers and heat-seal layers are employed, the label lid may be utilized with a wider variety of container materials, e.g., RPET, PET, APET, HDPE, PVC, PE, PETG, HIPS, and CPET, compared to conventional label lids. Importantly, this allows dairy-based products, e.g., butters, spreads, yogurts, to be stored in tray materials such as polypropylene and recycled polypropylene.

Conventional label stocks have been known to have adhesion problems when employed with some container substrates. For example, in conventional label stocks, PET and RPET could not be used. The present label lids have unique performance characteristics which beneficially serve both a lidding and reclosable label function. Conventional label stocks could not achieve these functions because conventional label stocks typically employ a pressure sensitive adhesive which is not as well suited as a heat-seal polymer to achieve the desired results.

Also, the combination of the specific heat-seal, facestock, and removable adhesive layers (and optional release coating as discussed below) addresses multiple reclosure issues that exist in conventional label stocks. For example, conventional label lids suffer from the inability to reopen/reclose multiple times (typical label stocks only allow one or two reclosures) and tearing/splitting of the label stock due to excessive adhesion (the label stock adheres too aggressively to the substrate). The unique performance characteristics of the present label lid avoids these problems.

In some embodiments, the label lid is peelable. In some cases, the label lid is also resealable to allow for partial consumption or use of the contents in the container, and repeated resealing of the container. In some embodiments, a frangible margin portion has a width that is the same as or similar to a width of the tray, e.g., within 10 or 20% thereof. Locking features may also be provided on the margin portion and a side wall of the tray to allow the margin portion to snap close against, or otherwise engage, the side wall, e.g., with a friction fit that can be released by manipulation. When engaged against the side wall, the margin portion may be designed to function as a base upon which the package may stand.

The bond between the facestock and heat-seal layers may be a reclosable/peelable/resealable bond such that these layers may be manually delaminated and re-adhered. The layers may comprise any suitable material such as a thermoplastic, a cellulosic, a metallic material, or combinations thereof, which may bond directly with the surface of the polymeric second layer.

Figure 6A:
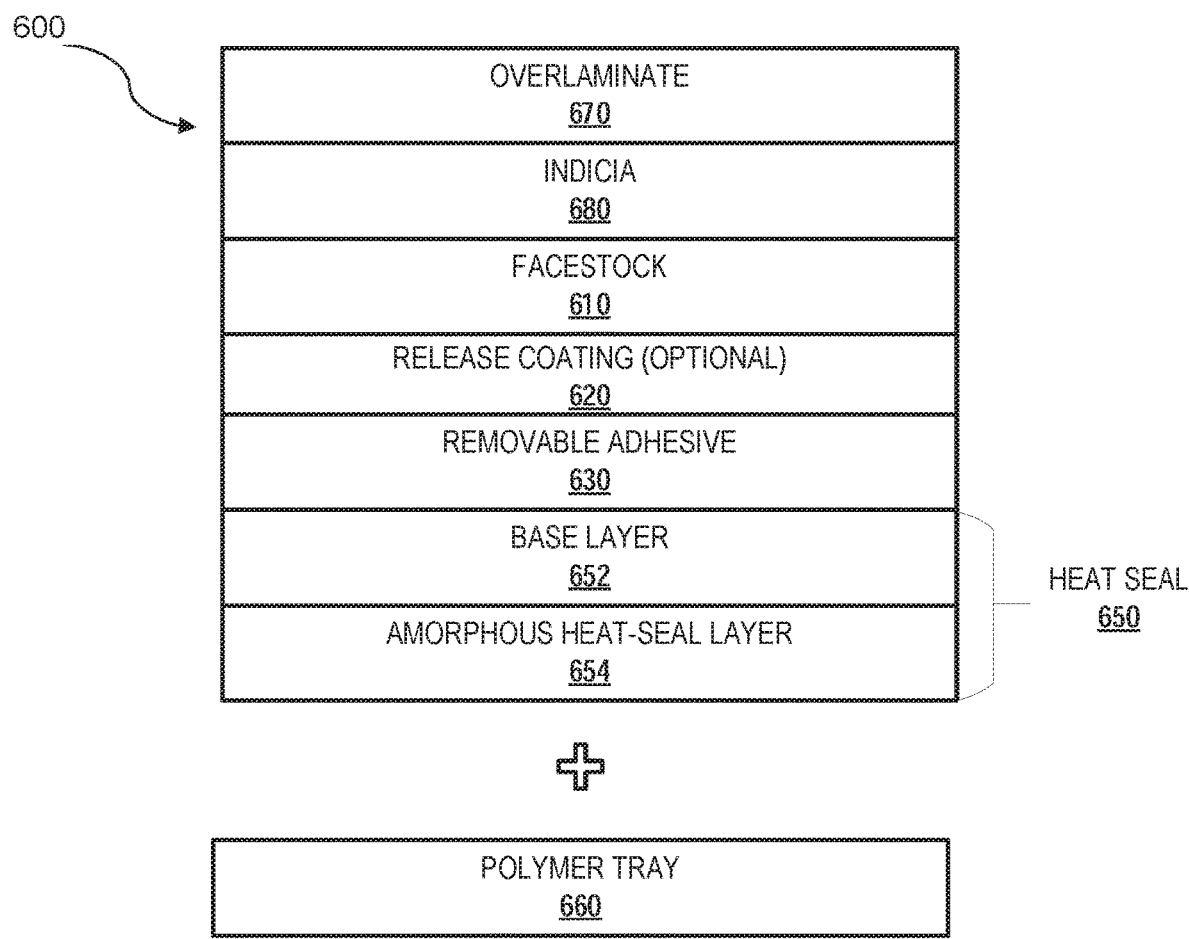
FIGS. 6A-6C show general configurations of the label lid including indicia and an overlaminate layer in accordance with embodiments of the disclosure.
Figure 6B:
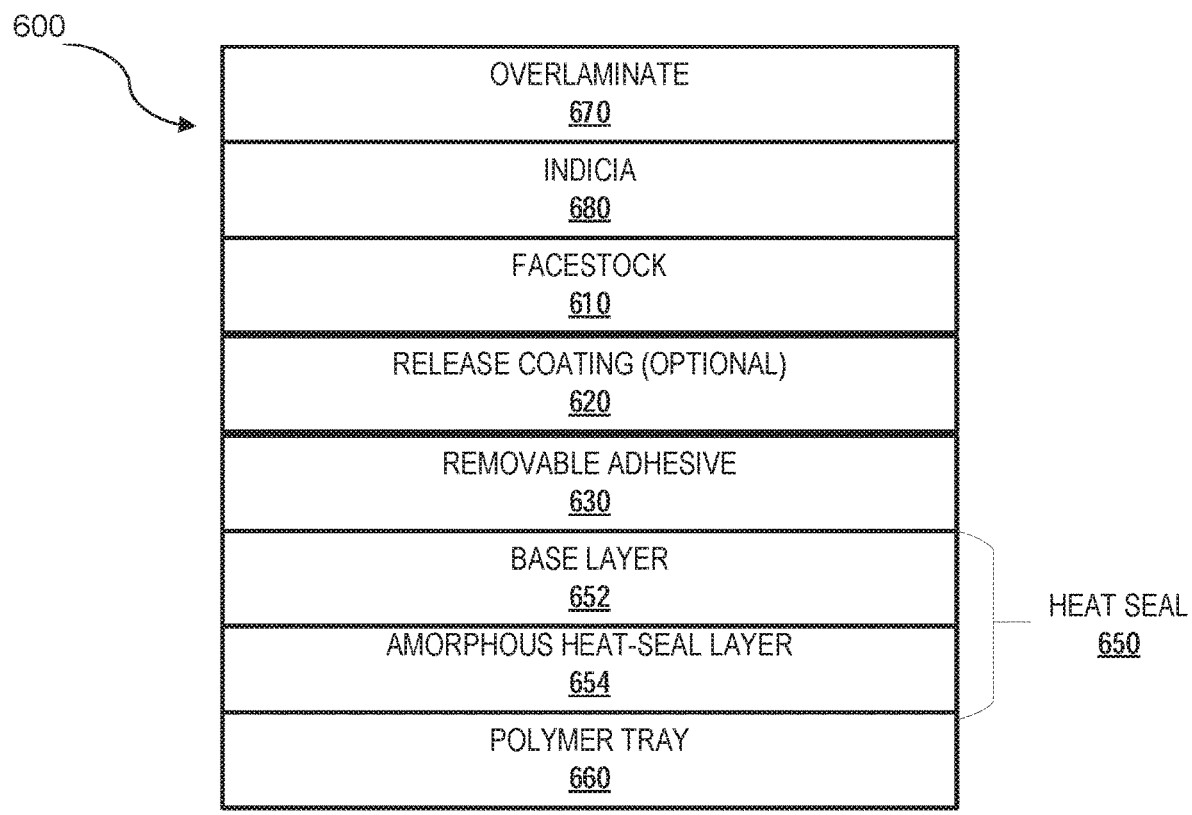
Figure 6C:
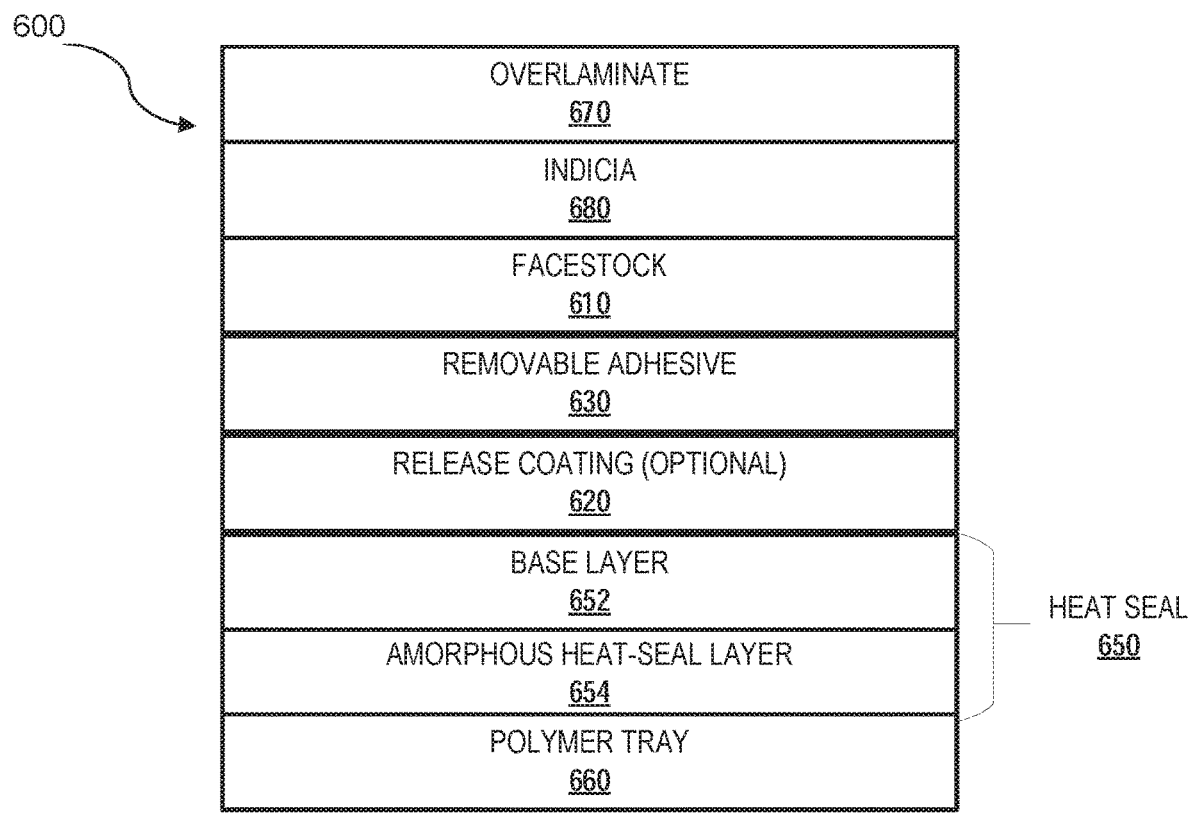

In some embodiments, indicia on a portion of the lidding film attached to the margin portion may serve as a side label, and indicia on a different portion of the lidding film, e.g., covering the cavity, may serve as a top label, as shown in FIGS. 6A-6C. Additionally, an optional overlaminate can be applied to protect the indicia and/or add additional stiffness to the label or lid.

The inventors have also found that including a release coating on the heat-seal layer or the facestock layer improves peeling and resealing properties of the label lid, and also provides for optimal peel strength between layers, which aids in efficient stripping of the matrix from the formed labels without damaging or breaking the matrix, e.g., the non-print receiving area. The release coating, e.g., on the heat-seal layer and/or the facestock layer, decreases the peel strength between these layers and the removable adhesive layer. As a result, the formed label can be peeled from the matrix without damaging the matrix. For example, when the heat-seal layer includes a release coating, the removable adhesive may be coated on the release-coated heat-seal layer. Due to the reduced peel strength, the matrix, e.g., the facestock layer and the removable adhesive, can be efficiently stripped from the substrate without damaging the matrix.

In some cases, this improvement in matrix stripping is achieved by employing, e.g., applying or extruding, a release coating on the heat-seal layer to reduce the peel strength between the heat-seal layer and the removable adhesive layer. In this embodiment, the removable adhesive may be directly coated on the facestock layer and then laminated to the coated side of the heat-seal layer. Alternatively, the removable adhesive may be coated on the release-coated heat-seal layer and then laminated to the facestock layer. In some cases, employing a release coating on the heat-seal layer provides a peel strength between the heat-seal layer and the removable adhesive layer in a range from 100 g/in to 400 g/in. It has been discovered that when the peel strength is within this range, e.g., is kept sufficiently low, then the matrix can be peeled from the heat-seal layer without damaging the matrix. Advantageously, the present process avoids conventional delaminating and relaminating process steps, thereby contributing to overall process efficiency. Additionally, the surface energies the labels were found to be surprisingly high which provides improved ink wet out and printing on the release surface, which in turn provides for significant improvements in printed label images.

In some cases, this improvement in matrix stripping is achieved by employing, e.g., applying or extruding, a release coating on the facestock layer to reduce the peel strength between the facestock layer and the removable adhesive layer. In this embodiment, the removable adhesive may be coated on the heat-seal layer and then laminated to the coated side of the facestock layer. The peel strength between the facestock layer and the removable adhesive layer has also been found to be important to matrix stripping improvements. In some embodiments, when the peel strength between the facestock layer and the removable adhesive layer is kept within a certain range, e.g., from 100 g/in to 400 g/in, the matrix can be peeled without damaging the matrix or the substrate.

Heat-Seal Layer

The heat-seal layer may comprise a variety of different materials. In some embodiments, the heat-seal layer may be heat-sealed to a container to which it is applied. For example, the heat-seal layer may be heat-sealed to a container. Heat-sealing techniques are well known in the art.

In some embodiments, the heat-seal layer may be in the form of a film. In some embodiments, the heat-seal layer may comprise a polymeric material. In some aspects, the heat-seal layer is a polymeric material that may seal to the container, e.g., a food-containing tray. In some aspects, the heat-seal layer and the container comprise the same polymeric composition. In some aspects, the heat-seal layer comprises a polyethylene terephthalate (PET), e.g. oriented PET, that is sealed to a PET-based container, with a coextruded sealant containing amorphous PET or PETG layers within the body of the coextrusion. In some embodiments, the heat-seal layer comprises one or more of oriented PET, amorphous PET, biaxially oriented polypropylene (BOPP), amorphous polypropylene, and peelable sealing resins, e.g., APPEEL® line of polymeric sealants from DuPont, Inc.

In one embodiment, the heat-seal layer may comprise copolyesters or blend of copolyesters obtained by substituting the terephthalic acid with isophthalicacid (iPET). In some cases, the heat-seal layer may include copolyesters or blends of copolyesters obtained by substituting the ethylene glycol with cyclohexanedimenthanol (CHDM) and/or 2,2,4,4-Tetramethyl-1,3-cyclobutanediol (CBDO).

In some embodiments, the heat-seal layer may comprise a layer of material which is activated by heat during the molding process to improve bonding of the label to a plastic article in the molding process. Materials for the heat-activatable first adhesive layer may comprise any heat-activatable adhesive or thermoplastic film material.

In some embodiments, the heat-seal layer may comprise an ethylene/unsaturated ester copolymer. The ethylene/unsaturated ester copolymer may comprise any ethylene/unsaturated ester copolymer or derivative thereof. For example, the ethylene/unsaturated ester copolymer or derivative thereof may comprise one or more of ethylene/methyl acrylate copolymer, ethylene/methyl methacrylate copolymer, ethylene/ethyl acrylate copolymer, ethylene/ethyl methacrylate copolymer, ethylene/butyl acrylate copolymer, ethylene/2-ethylhexyl methacrylate copolymer, ethylene/vinyl acetate copolymer, and blends thereof, and more particularly an ethylene/vinyl acetate copolymer or blends thereof.

In some embodiments, the heat-seal layer may comprise homopolymers and copolymers of alkyl-aromatic esters. For example, the heat-seal layer may comprise polyethylene terephthalate (PET), amorphous polyethylene terephthalate (APET), crystalline polyethylene terephthalate (CPET), glycol-modified polyethylene terephthalate (PETG), and polybutylene terephthalate. In some aspects, the heat-seal layer may comprise copolymers of terephthalate and isophthalate, such as, for example, polyethylene terephthalate/isophthalate copolymer. In some aspects, the heat-seal layer may comprise homopolymers and copolymers of aliphatic esters such as, for example, polylactic acid (PLA) and polyhydroxyalkonates, such as, for example, but not limited to, polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D), and blends thereof.

In some embodiments, the heat-seal layer may include at least two component layers. For example, the heat-seal layer may comprise a base layer to provide the mechanical strength and a seal layer to provide sealing capability. In some aspects, the seal layer may have a melting point or softening point below that of the base layer. The base layer may be thermally adhered to the circumference of the container mouth. In some cases, the seal layer comprises an amorphous material. In some cases, the seal layer may comprise the same material as the container. In some cases, the seal layer may comprise an amorphous version of the container material. For example, the container may comprise PET and the seal layer may comprise amorphous PET. In other embodiments, the seal layer and the container may comprise different materials.

In some embodiments, the base layer comprises one or more of oriented PET or BOPP. In some embodiments, the seal layer comprises one or more of amorphous PET, amorphous polypropylene, and peelable sealing resins, e.g., APPEEL® line of polymeric sealants from DuPont, Inc. In some aspects, the base layer comprises PET, e.g., oriented PET, and the seal layer comprises amorphous PET. In some aspects, the base layer comprises BOPP and the seal layer comprises amorphous polypropylene. In some aspects, the base layer comprises BOPP and the seal layer comprises a peelable sealing resin, e.g., APPEEL® line of polymeric sealants from DuPont, Inc.

In some embodiments, the heat-seal layer may be formed by coextruding the base layer and the seal layer. For example, a coextruded heat-seal layer may be produced by coextruding base layer comprising PET and a seal layer, e.g., heat-sealable layer, comprising an amorphous polyester copolymer layer. In some cases, the copolyesters are obtained by substituting the terephthalic acid with isophthalicacid (iPET) or by substituting the ethylene glycol with cyclohexanedimenthanol (CHDM). For example, Eastman Chemical Co.'s Eaststar grade PETG 6763 is a copolyester of terephthalic acid with about 33 mole % of 1,4-cyclohexane dimethanol and about 67 mole % of ethylene glycol.

In some embodiments, the heat-seal layer can also be offline or inline coated. Offline coating can be achieved by either melt extrusion (extrusion coating or coextrusion coating) or by solvent coating. However, solvent coating may have additional costs as well as adverse environmental risk associated with volatile organic compounds (VOCs). In some cases, the heat-seal extrusion coatings can use either polyesters or vinyl polyolefins such as ethylene vinyl acetate (EVA).

In some embodiments, the heat-seal layer may comprise amorphous PET, e.g., isophthalic acid (iPET) or PETG, that are co-extruded with polyester due to their compatibility and similar melt viscosity. In some cases, if other heat-seal materials are also desired, offline extrusion coating or solvent coating can be employed. Different healsealing materials are used to seal to different trays or to achieve different seal strength.

In one embodiment, the heat-seal layer may comprise two layers of PET. In some cases, the first layer may comprise a PET base layer and the second layer may comprise amorphous PET (APET), as previously described. Advantageously, the strength of the seal to a PET container can be varied by increasing the amount of APET in the heat-seal film structure. This provides the added benefit of tailoring a label lid to a particular substrate. The inventors have found that the use of an amorphous PET provides for a destruct bond, especially when particular thicknesses are employed. A destruct bond occurs when the interlayer adhesion of all bonded polymers is less than the seal strength. This results in tearing of the polymer composite, rather than removal from a lid or flange surface.

In some embodiments, the heat-seal layer may comprise other suitable materials that can seal to a PET substrate, e.g., a PET container. Other suitable heat-seal layer materials include a two component material comprising a base layer of PET that is extrusion coated with an EVA or EMA sealant polymer. Exemplary sealant polymers include the APPEEL® line of polymeric sealants from DuPont, Inc. The use of these EMA and EVA materials have been found to improve bond strength in the range from 1 lbs/lineal inch to 10 lbs/lineal inch, e.g., from 1 to 5 lbs/lineal inch or from 2 to 4 lbs/lineal inch.

In some embodiments, the heat-seal layer (optionally for use with PET containers) may comprise commercial heat seal layers, e.g., Toray LUMIRROR® PA25. In some embodiments, suitable commercial heat-seal layers (optionally for use with PET, APET, and RPET) include Mylar® 850H (from DuPont Teijin Films), FlexPET™ F-HSP (from Flex Films), Mylar® OL13 (from DuPont Teijin Films), and SealPhane 10.94 (from Terphane).

In one embodiment, the heat-seal layer is free of both polybutylene and an ionomer resin. In one embodiment, the heat-seal film is comprised of the same material, e.g., polymeric material, as the tray to which it is applied.

In some cases, the label lid comprises an additional seal layer. The additional seal layer is preferably sandwiched between the removable adhesive layer and the facestock.

In some embodiments, the thickness of the heat-seal layer may range from 2 microns to 75 microns, e.g., from 2 microns to 50 microns, from 3 microns to 40 microns, from 4 microns to 30 microns, from 5 microns to 25 microns, from 10 microns to 30 microns, from 10 microns to 25 microns, from 15 microns to 25 microns, or from 18 microns to 22 microns. In terms of upper limits, the thickness of the heat-seal layer may be less than 75 microns, e.g., less than 60 microns, less than 50 microns, less than 40 microns, less than 30 microns, or less than 25 microns. In terms of lower limits, the thickness of the heat-seal layer may be at least 2 microns, e.g., at least 3 microns, at least 4 microns, at least 5 microns, at least 10 microns, at least 15 microns, or at least 20 microns.

In some embodiments, the heat-seal layer may comprise a base layer and a seal layer. In some embodiments, the thickness of the base layer may range from 2 microns to 60 microns, e.g., from 3 microns to 50 microns, from 4 microns to 40 microns, from 5 microns to 30 microns, from 10 microns to 25 microns, or from 15 microns to 20 microns. In terms of upper limits, the thickness of the base layer may be less than 60 microns, e.g., less than 50 microns, less than 40 microns, less than 30 microns, or less than 25 microns. In terms of lower limits, the thickness of the base layer may be at least 2 microns, e.g., at least 3 microns, at least 5 microns, at least 8 microns, at least 10 micron, at least 12 microns, or at least 15 microns.

In some embodiments, the thickness of the seal layer may range from 0.1 micron to 30 microns, e.g., from 0.1 micron to 25 microns, 0.2 microns to 20 microns, from 0.4 microns to 15 microns, from 0.5 microns to 10 microns, from 0.6 micron to 5 microns, from 0.7 microns to 2 microns, from 0.8 microns to 1.5 microns, or from 1 microns to 1.2 microns. In terms of upper limits, the thickness of the seal layer may be less than 30 microns, e.g., less than 25 microns, less than 20 microns, less than 15 microns, less than 10 microns, less than 5 microns, or less than 1 microns. In terms of lower limits, the thickness of the seal layer may be at least 0.1 micron, e.g., at least 0.2 microns, at least 0.3 microns, at least 0.4 microns, at least 0.5 micron, at least 0.6 microns, at least 0.7 microns, at least 0.8 microns, or at least 0.9 microns.

Facestock Layer

The facestock layer may comprise a variety of different materials. In some embodiments, the facestock layer may be in the form of a film. In some cases, the facestock layer comprises oriented films. For example, the oriented films may include, but are not limited to, polyester, oriented nylon (OPA), biaxially oriented polypropylene (BOPP), biaxially oriented polyethylene (BOPE), polyethylene terephthalate, oriented polyethylene terephthalate (PET), uniaxially oriented high density polyethylene (UHDPE), treated polyolefin, e.g., machine direction oriented and/or corona-treated, oriented polystyrene (OPS), cellophane, polylactic acid (PLA), and combinations thereof. In some embodiments, the facestock layer may comprise polymers of olefins, nylons, terepthalates, styrenes, acids, and mixtures thereof. In some aspects, the oriented films may comprise polyvinyl chloride. In some aspects, the facestock layer may comprise oriented PET film and is sealed to a PET tray so that the resulting label lid is also recyclable.

In some embodiments, the facestock layer may comprise one or materials selected from the materials mentioned above with respect to the heat-seal layer. In some embodiments, the material of the facestock layer is oriented and the heat-seal layer is not oriented. In some embodiments, the facestock layer and the heat-seal layer comprise the same material. In other embodiments, the facestock layer and the heat-seal layer comprise different materials. In some embodiments, the facestock layer comprises one or more of oriented PET or BOPP.

In some cases, prior to die cutting processes, the face side of the facestock layer is printed with indicia, e.g., desired graphics. In some cases, the facestock layer has a "deadened" portion, which provides a feature to pull open the facestock from the pressure sensitive material. In some cases, the facestock layer may include die cut or laser perforated holes to allow for respiration of produce. Advantageously, providing die or laser-cut holes in the facestock layer or top layer of the label lid provides breathability to the contents of a sealed container. The feature of die or laser-cut holes in the facestock layer or top layer of the label lid is not well-known in the label industry. The unique configuration of the present label lid allows for this feature and represents a surprising additional improvement.

In some embodiments, the facestock layer is coextruded along with the heat-seal, removable adhesive, and optional release coating layers. In some cases, a primer can be applied on the facestock layer to increase the adhesive anchorage.

The thickness of the facestock layer may vary widely. In some embodiments the thickness of the facestock layer may range from 0.5 microns to 180 microns, e.g., from 1 microns to 150 microns, from 5 microns to 100 microns, from 10 microns to 80 microns, from 15 microns to 50 microns, from 20 microns to 45 microns, from 25 micron to 45 microns, or from 30 microns to 40 microns. In terms of upper limits, the thickness of the facestock layer may be less than 180 microns, e.g., less than 160 microns, less than 140 microns, less than 120 microns, less than 100 microns, less than 80 microns, less than 75 microns, less than 70 microns, less than 60 microns, less than 50 microns, or less than 40 microns. In terms of lower limits, the thickness of the facestock layer may be at least 0.5 microns, e.g., at least 1 micron, at least 5 microns, at least 10 microns, at least 15 microns, or at least 20 microns.

In some embodiments, the facestock layer is heat stable through a sealing temperature ranging from 130° C. to 205° C., e.g., from 140° C. to 200° C., from 150° C. to 180° C., or from 160° C. to 180° C. The sealing temperature is the temperature at which the label lid is sealed to the container.

In some embodiments, the facestock layer and the heat-seal layer, e.g., seal layer, both comprise a PET, heatsealable PET or OPP film. In this embodiment, the removable adhesive, e.g., pressure sensitive adhesive, is patterned such that there is no adhesive along the outer edge of at least one side of the adhesive. The removable adhesive is preferably patterned on at least one side which will be heat-sealed to the heat-seal layer underneath. This embodiment allows for the top face of the heat-seal layer to be die cut or scored to form a hinge. In some aspects, the top layer of the heat-seal layer further includes an overlaminate to increase the thickness and stiffness of the hinge. The hinge may provide a portion of the top layer of the heat-seal layer for opening or closing the label lid on a substrate, e.g., a container.

In some embodiments, when the label lid is peeled from a substrate, the removable adhesive has a clean peel and stays with the remainder of the label lid and does not split or transfer therefrom. The differential peel can also be achieved by dual layer coating or dual layer die coating with different adhesives. As used herein, a differential peel is a peel that is not a weld seal, and therefore a differential or peelable seal.

Removable Adhesive Layer

The removable adhesive layer may comprise a variety of different materials. The removable adhesive layer is a layer that has the ability to remove the label from a substrate, e.g., a container or tray, without leaving residue or distorting the substrate or label itself. In some aspects, the removable adhesive layer is a resealable adhesive such that the removable adhesive layer can be used for multiple iterations. For example, the removable adhesive layer can be repeatedly removed from the substrate, e.g., the release layer, and resealed to the substrate. In some aspects, the removable adhesive layer is resealable such that it enables the lid, or a portion thereof, to be repeatedly removed or otherwise repositioned so as to allow access to the interior of the container. After accessing the interior of the container, the lid or cover can be appropriately positioned over the opening and engaged with the container to thereby reseal the container.

In some embodiments, the removable adhesive layer may be in the form of a film, e.g., formed by the coating of the adhesive to the heat-seal layer or facestock layer. The removable adhesive layer may be a material described in International Patent Application Nos. PCT/CN2017/079697 and PCT/CN2017/073083; US Publication Nos. 2010/0002963 and US2013/055682; and International Publication Nos. WO2010114879A1, WO2011032064, WO2012036765A1, and WO2011123410A1. All of these references are hereby incorporated by reference. The disclosure of these references also provide examples of materials and commercial products suitable for other components of the label lid and container.

In one embodiment, the removable adhesive layer may comprise an adhesive selected from solvent-based adhesives, water based emulsion adhesives, hot-melt adhesives, and mixtures thereof. In some aspects, the removable adhesive comprises a blend of acrylic emulsions of pressure sensititve adhesives.

In some embodiments, the removable adhesive may comprise a dual layer coating. The dual layer coating or dual layer die-coating provides a two layer adhesive coating and in many cases reduces the cost by adjusting the composition based on performance requirements. For reclosure applications, for example, a stronger adhesion to the label facestock is desirable compared with the adhesion to the heat-seal layer so that when the label is peeled off, the adhesive cleanly stays with the label.

In some embodiments, the removable adhesive layer comprises a pressure sensitive adhesive (PSA). The PSA may comprise a first component comprising an elastomer and a second component comprising a tackifier. In some embodiments, the elastomer may comprise styrene/rubber copolymers which may include, but are not limited to, polystyrenelbutadiene/styrene (SBS), polystyrene/isoprene/styrene (SIS), polystyrene/ethylene-butylene/styrene (SEBS), and polystyrene/ethylenepropylene/styrene (SEPS), or blends of any of these materials.

The tackifier may comprise any tackifier conventionally used with elastomers to form pressure sensitive adhesives. In some embodiments, suitable tackifiers include, but are not limited to, hydrocarbon tackifiers such as terpene resins, e.g., resins sold under the trademark Zonatac® by Arizona Chemical Company (Jacksonville, Fla.) and petroleum hydrocarbon resins, e.g., resins sold under the trademark Escorez™ by ExxonMobil Chemical Company (Houston, Tex.). In some embodiments, the removable adhesive layer can be selectively de-tackified in specific areas to aid in matrix stripping.

In some cases, the removable adhesive layer may be patterned. The removable adhesive layer may include patterned areas of the adhesive such that the first and second polymer films are separated by the adhesive. In the unpatterned areas of the adhesive layer, the first and second polymer films bond to each other without the adhesive therebetween. In some aspects, the first and second polymer films may be configured to delaminate from each other in the patterned areas.

In some embodiments, the thickness of the removable adhesive layer may range from 1 micron to 50 microns, e.g., from 2 micron to 40 microns, from 3 microns to 30 microns, from 4 microns to 28 microns, 5 microns to 26 microns, from 10 microns to 25 microns, from 12 microns to 20 microns, or from 15 microns to 18 microns. In terms of upper limits, the thickness of the removable adhesive layer may be less than 50 microns, e.g., less than 45 microns, less than 40 microns, less than 35 microns, less than 30 microns, less than 25 microns, or less than 20 microns. In terms of lower limits, the thickness of the removable adhesive layer may be at least 1 micron, e.g., at least 2 microns, at least 4 microns, at least 8 microns, at least 10 microns, at least 12 microns, or at least 15 microns.

In some aspects, the removable adhesive layer may be coated on the facestock layer or the heat-seal layer. In some aspects, the facestock layer or the heat-seal layer includes a release coating and the removable adhesive layer may be coated on the release coating. In some embodiments, the coat weight of the removable adhesive layer in the label may range from 8 g/m$^2$ to 30 g/m$^2$, e.g., from 10 g/m$^2$ to 26 g/m$^2$, from 12 g/m$^2$ to 22 g/m$^2$, from 14 g/m$^2$ to 20 g/m$^2$, or from 16 g/m$^2$ to 18 g/m$^2$. In terms of upper limits, the coat weight of the removable adhesive layer in the label may be less than 30 g/m$^2$, e.g., less than 26 g/m$^2$, less than 22 g/m$^2$, less than 20 g/m$^2$, or less than 18 g/m$^2$. In terms of lower limits, the coat weight of the removable adhesive layer in the label may be greater than 8 g/m$^2$, e.g., greater than 10 g/m$^2$, greater than 12 g/m$^2$, greater than 14 g/m$^2$, or greater than 16 g/m$^2$. In some aspects, the specific gravity of the removable adhesive layer is in a range from 0.9 to 1.1.

Release Coating

In some embodiments, the label lid configuration may include a release coating on the facestock layer and/or the heat-seal layer. The composition of the release coating may vary widely. In some embodiments, the release coating may be in the form of a film (formed by coating the facestock layer or the heat-seal layer). In some aspects, the release coating is coated on facestock layer and/or the heat-seal layer before coating the removable adhesive layer. In some aspects, the release coating is in direct contact with the removable adhesive layer.

The release coating may be applied by any means, e.g., extruded, coated, laminated, or adhered, to one of the layers of the label lid. In some aspects, the release coating is a layer that is provided on the facestock layer and/or the heat-seal layer. In some aspects, the release coating is applied to a layer, e.g., facestock layer or the heat-seal layer, that is not coated with a removable adhesive layer. In some aspects, the release coating is off-line coated, in-line coated, or extruded onto the facestock layer, e.g., onto a bottom side of the facestock layer. In some aspects, the release coating is off-line coated, in-line coated, or extruded onto the heat-seal layer, e.g., a top side of the heat-seal layer.

In some embodiments, the release coating may be coated on the top-side of the heat-seal layer, e.g., the non-heat seal side, before bonding the top-side of the heat-seal layer to the facestock layer. In some embodiments, the release coating may be coated on the bottom-side of the facestock layer, e.g., the bottom layer, before laminating the bottom-side of the facestock layer to heat-seal layer. The release coating enables the matrix to be stripped from the label without breaking or damaging the matrix.

In some embodiments, the release coating is a silicone material or a fluoropolymer material. In some embodiments, release coating may comprise a silicone, fluoropolymer, polyethylene, polyolefin, polyester, polyvinyl chloride, polyvinyl fluoride, polyvinylidene difluoride, polyvinyl acetate/acrylate, modified polyurethane, polyester, wax, acrylate, acrylic, modified starch, or blends thereof.

In some embodiments, the release coating may comprise solvent-based emulsions, water based emulsions, and mixtures thereof. In some aspects, the release coating comprises a blend of acrylic emulsions. In some aspects, the release coating comprises a blend of ACRYGEN 27 from Omnova Solutions, Inc., Chester, S.C, and SunCryle HP114 from Omnova Solutions, Inc., Chester, S.C. In some aspects, the release coating comprises from 60 wt % to 95 wt % of ACRYGEN 27, e.g., from 65 wt % to 90 wt %, from 70 wt % to 85 wt %, or from 75 wt % to 80 wt %. In some aspects, the release coating comprises less than 95 wt % of ACRYGEN 27, e.g., less than 90 wt %, less than 85 wt %, or less than 80 wt %. In some aspects, the release coating comprises greater than 60 wt % of ACRYGEN 27, e.g., greater than 65 wt %, greater than 70 wt %, or greater than 75 wt %. In some aspects, the release coating comprises from 5 wt % to 40 wt % of SunCryle HP114, e.g., from 10 wt % to 35 wt %, from 15 wt % to 30 wt %, or from 20 wt % to 25 wt %. In some aspects, the release coating comprises less than 40 wt % of SunCryle HP114, e.g., less than 35 wt %, less than 30 wt %, or less than 25 wt %. In some aspects, the release coating comprises greater than 5 wt % of SunCryle HP114, e.g., greater than 10 wt %, greater than 15 wt %, or greater than 20 wt %.

In some cases, the release coating may include commercial silicone release coatings, polyethylene coated polyethylene terephthalate films, or cast polypropylene films that can be embossed with a pattern or patterns. In some aspects, the release coating is kraft paper which has a coating of low density polyethylene on the front side with a silicone release coating and a coating of high density polyethylene on the back side. Other release coatings known in the art are also suitable as long as the release characteristics (relative to the removable adhesive layer) result. It is noted that the combination of the release coating with the other components, as described herein, provides a surprising, synergistic result.

In some embodiments, if a release coating is applied, it can be dried or cured following application by any suitable radiation or thermal means, e.g., UV, as are well known in the art.

In some embodiments the thickness of the release coating may range from 0.01 microns to 10 microns, e.g., from 0.05 micron to 8 microns, from 0.1 microns to 6 microns, from 0.3 microns to 4 microns, 0.5 microns to 3 microns, from 0.8 microns to 2 microns, or from 1 microns to 1.5 microns. In terms of upper limits, the thickness of the release coating may be less than 10 microns, e.g., less than 8 microns, less than 6 microns, less than 4 microns, less than 2 microns, or less than 1 microns. In terms of lower limits, the thickness of the release coating may be at least 0.01 micron, e.g., at least 0.05 microns, at least 0.1 microns, or at least 0.5 microns.

In some aspects, the release coating may be disposed on the facestock layer or the heat-seal layer. In some embodiments, the coat weight of the release coating in the label may range from 0.4 g/m$^2$ to 2 g/m$^2$, e.g., from 0.6 g/m$^2$ to 1.8 g/m$^2$, from 0.8 g/m$^2$ to 1.6 g/m$^2$, from 0.9 g/m$^2$ to 1.4 g/m$^2$, or from 1.0 g/m$^2$ to 1.2 g/m$^2$. In terms of upper limits, the coat weight of the release coating in the label may be less than 2 g/m$^2$, e.g., less than 1.8 g/m$^2$, less than 1.6 g/m$^2$, less than 1.4 g/m$^2$, or less than 1.2 g/m$^2$. In terms of lower limits, the coat weight of the release coating in the label may be greater than 0.4 g/m$^2$, e.g., greater than 0.6 g/m$^2$, greater than 0.8 g/m$^2$, greater than 1.0 g/m$^2$, or greater than 1.1 g/m$^2$.

Matrix Stripping

In some embodiments, the label comprises a facestock layer, a heat-seal layer, a removable adhesive layer, and optionally a release coating (in the particular configurations discussed herein). In some aspects, the release coating is sandwiched between the heat-seal layer and the removable adhesive layer. In some aspects, the release coating is sandwiched between the facestock layer and the removable adhesive layer. It is also contemplated that multiple release coatings may be employed. For example, one release coating layer may be sandwiched between the heat-seal layer and the removable adhesive layer and another release layer may be sandwiched between the facestock later and the removable adhesive layer. The release coating reduces the peel strength between the facestock and/or heat-seal layer and the removable adhesive layer, thereby providing improved die-cutting and matrix stripping of the formed labels.

The present disclosure provides for improved label matrix stripping using the label configuration described herein. The matrix stripping force is the force required to break the bond between two layers in the label. In some embodiments, the plurality of labels are formed by die-cutting a layer of label stock, e.g., having the configuration described above, and then stripping or separating the matrix, leaving the die-cut labels. However, the matrix is often guided in a divergent path as compared to the die-cut labels. In many applications, matrix stripping cannot be achieved, particularly as production line speeds are increased or lighter, more fragile, or more flexible material are investigated for their use in label constructions.

The inventors have found that utilizing any of the specific combination of release coatings on the facestock layer and/or the heat-seal layer beneficially provides an ideal peel strength that promotes matrix stripping without breaking or damaging the matrix or formed labels. In some aspects, the process for producing labels includes providing a facestock layer having a release coating on a first side. In other aspects, the process for producing labels includes providing a heat-seal layer having a release coating on a first side. In some aspects, the removable adhesive layer may be coated on the release coating. The specific layers of the label enables the matrix to be stripped from the labels at higher line speeds. Additionally, due to the improved matrix stripping properties, additional materials with desired properties (e.g., lighter, more fragile, or more flexible material) can be utilized in the production process of the labels.

In some cases, the release coating applied to the facestock layer and/or the heat-seal layer provides for a reduced bonding strength to enable efficient stripping from the matrix. For example, the peel strength to break the bond between facestock/heat-seal layer and removable adhesive layer may range from 100 grams/inch to 400 grams/inch, e.g., from 150 grams/inch to 350 grams/inch, from 200 grams/inch to 300 grams/inch, from 220 grams/inch to 280 grams/inch, or from 240 grams/inch to 260 grams/inch. In terms of upper limits, the peel strength to break the bond between these layers may be less than 400 grams/inch, e.g., less than 360 grams/inch, less than 340 grams/inch, 320 grams/inch, less than 280 grams/inch, less than 260 grams/inch, or less than 240 grams/inch. In terms of lower limits, the peel strength to break the bond between these layers may be at least 100 grams/inch, e.g., at least 120 grams/inch, at least 140 grams/inch, at least 160 grams/inch, at least 180 grams/inch, at least 200 grams/inch, or at least 220 grams/inch. It was found that having a bond between the facestock layer/heat-seal layer and the removable adhesive layer with the aforementioned peel strength provided efficient matrix stripping without damaging or breaking the matrix or the formed labels.

In some aspects, the peel strength for breaking the bond between the label layer, e.g., the heat-seal layer and the substrate, and the matrix, e.g., the facestock layer and the removable adhesive layer, is less than the tensile strength of each of the layers in the label. For example, in embodiments where the removable adhesive layer is coated on the facestock layer, the peel strength between the facestock layer and the removable adhesive layer is greater than the peel strength between the heat-seal layer and the removable adhesive layer. However, the peel strength to break the bond between the label layer and the matrix layer should not be greater than the tensile strength of each respective layer in the label, e.g., the facestock layer, the removable adhesive layer, and the heat-seal layer. By including layers that satisfy these conditions, none of the layers of the label break or damage during matrix stripping. In some aspects, the tensile strength of each of layers is at least 10% greater than the peel strength to break the bond between the label layer and the matrix layer, e.g., greater than 15%, greater than 20%, greater than 25%, greater than 30%, greater than 35%, greater than 40%, greater than 45%, or greater than 50%.

In some embodiments, the matrix only comprises the facestock. In other embodiments, the matrix comprises the facestock and the release coating. In still other embodiments, the matrix comprises the facestock and the removable adhesive layer. In some aspects, the matrix comprises one or more of the facestock, the release coating, and the removable adhesive layer. In each instance, the force to strip the matrix from the residual substrate, e.g., label layer, tray, or container, is less than the force to break the matrix.

In some aspects, the break strength, e.g., the strength to break or damage the matrix, of the matrix may range from 700 kg/cm$^2$ to 2800 kg/cm$^2$, e.g., from 800 kg/cm$^2$ to 2600 kg/cm$^2$, from 1000 kg/cm$^2$ to 2400 kg/cm$^2$, from 1200 kg/cm$^2$ to 2200 kg/cm$^2$, from 1400 kg/cm$^2$ to 2000 kg/cm$^2$, or from 1600 kg/cm$^2$ to 1800 kg/cm$^2$. In terms of upper limits, the break strength of the matrix may be less than 2800 kg/cm$^2$, e.g., less than 2600 kg/cm$^2$, less than 2400 kg/cm$^2$, less than 2200 kg/cm$^2$, less than 2000 kg/cm$^2$, or less than 1800 kg/cm$^2$. In terms of lower limits, the break strength of the matrix may be at least 700 kg/cm$^2$, e.g., at least 800 kg/cm$^2$, at least 1000 kg/cm$^2$, at least 1200 kg/cm$^2$, at least 14000 kg/cm$^2$, at least 1500 kg/cm$^2$, or at least 1600 kg/cm$^2$.

In some embodiments, the peel strength between the facestock layer and the removable adhesive layer is greater than the peel strength between the heat-seal layer and the removable adhesive layer. In some cases, the peel strength between the facestock layer and the removable adhesive layer is at least 5% greater than the peel strength between the heat-seal layer and the removable adhesive layer, e.g., at least 10% greater, at least 20% greater, at least 25% greater, at least 30% greater, at least 40% greater, at least 50%, or at least 60% greater.

In some embodiments, the peel strength between the heat-seal layer and the release coating is greater than the peel strength between the heat-seal layer and the removable adhesive layer. In some cases, the peel strength between the heat-seal layer and the release coating is at least 5% greater than the peel strength between the heat-seal layer and the removable adhesive layer, e.g., at least 10% greater, at least 20% greater, at least 25% greater, at least 30% greater, at least 40% greater, at least 50%, or at least 60% greater. In this respect, during matrix stripping, the removable adhesive layer will remain bonded to facestock layer.

In some aspects, the peel strength to break the bond between the heat-seal layer and the removable adhesive layer ranges from 100 grams/inch to 400 grams/inch, the peel strength to break the bond between the facestock layer and the removable adhesive layer may be greater than 400 grams/inch, and the peel strength to break the bond between the heat-seal layer and the release coating may be greater than 400 grams/inch. In some aspects, the peel strength to break the bond between the facestock layer and the removable adhesive layer and the peel strength to break the bond between the heat-seal layer and the release coating each are greater than 400 grams/inch, e.g., greater than 450 grams/inch, greater than 500 grams/inch, greater than 550 grams/inch, greater than 600 grams/inch, greater than 650 grams/ inch, or greater than 700 grams/inch. In terms of ranges, the peel strength between these layers is in a range from 400 grams/inch to 1000 grams/inch, e.g., from 450 grams/inch to 950 grams/inch, from 500 grams/inch to 900 grams/inch, from 550 grams/inch to 850 grams/inch, from 600 grams/inch to 800 grams/inch, or from 650 grams/inch to 750 grams/inch. In terms of upper limits, the peel strength between these layers is less than 1000 grams/inch, e.g., less than 950 grams/inch, less than 900 grams/inch, less than 850 grams/inch, less than 800 grams/inch, or less than 750 grams/inch.

In some embodiments, the peel strength between the heat-seal layer and the removable adhesive layer is greater than the peel strength between the facestock layer and the removable adhesive layer. In some cases, the peel strength between the heat-seal layer and the removable adhesive layer is at least 5% greater than the peel strength between the facestock layer and the removable adhesive layer, e.g., at least 10% greater, at least 20% greater, at least 25% greater, at least 30% greater, at least 40% greater, at least 50%, or at least 60% greater. Additionally, in this embodiment, the peel strength between the facestock layer and the release coating is greater than the peel strength between the facestock layer and the removable adhesive layer. In some cases, the peel strength between the facestock layer and the release coating is at least 5% greater than the peel strength between the facestock layer and the removable adhesive layer, e.g., at least 10% greater, at least 20% greater, at least 25% greater, at least 30% greater, at least 40% greater, at least 50%, or at least 60% greater. In this respect, during matrix stripping, the removable adhesive layer will remain bonded to heat-seal layer.

In some aspects, the peel strength to break the bond between the facestock layer and the removable adhesive ranges from 100 grams/inch to 400 grams/inch, the peel strength to break the bond between the heat-seal layer and the removable adhesive layer may be greater than 400 grams/inch, and the peel strength to break the bond between the facestock layer and the release coating may be greater than 400 grams/inch. In some aspects, the peel strength to break the bond between the heat-seal layer and the removable adhesive layer and the peel strength to break the bond between the facestock layer and the release coating each are greater than 400 grams/inch, e.g., greater than 450 grams/inch, greater than 500 grams/inch, greater than 550 grams/inch, greater than 600 grams/inch, greater than 650 grams/inch, or greater than 700 grams/inch. In terms of ranges, the peel strength between these layers is in a range from 400 grams/inch to 1000 grams/inch, e.g., from 450 grams/inch to 950 grams/inch, from 500 grams/inch to 900 grams/inch, from 550 grams/inch to 850 grams/inch, from 600 grams/inch to 800 grams/inch, or from 650 grams/inch to 750 grams/inch. In terms of upper limits, the peel strength between these layers less than 1000 grams/inch, e.g., less than 950 grams/inch, less than 900 grams/inch, less than 850 grams/inch, less than 800 grams/inch, or less than 750 grams/inch.

As noted above, the use of the release coating unexpectedly improves matrix stripping properties of the formed labels. In some cases, when the release coating is applied to the heat-seal layer, the peel strength to break the bond between the heat-seal layer and the removable adhesive layer ranges from 100 grams/inch to 400 grams/inch, e.g., from 150 grams/inch to 350 grams/inch, from 200 grams/inch to 300 grams/inch, from 220 grams/inch to 280 grams/inch, or from 240 grams/inch to 260 grams/inch. In terms of upper limits, the peel strength to break the bond between these layers may be less than 400 grams/inch, e.g., less than 360 grams/inch, less than 340 grams/inch, 320 grams/inch, less than 280 grams/inch, less than 260 grams/inch, or less than 240 grams/inch. In terms of lower limits, the peel strength to break the bond between these layers may be at least 100 grams/inch, e.g., at least 120 grams/inch, at least 140 grams/inch, at least 160 grams/inch, at least 180 grams/inch, at least 200 grams/inch, or at least 220 grams/inch. In this embodiment, the peel strength to break the bond between the facestock layer and the removable adhesive layer may be greater than 400 grams/inch, and the peel strength to break the bond between the heat-seal layer and the release coating may be greater than 400 grams/inch.

In another case, when the release coating is applied to the facestock layer, the peel strength to break the bond between the facestock layer and the removable adhesive layer ranges from 100 grams/inch to 400 grams/inch, e.g., from 150 grams/inch to 350 grams/inch, from 200 grams/inch to 300 grams/inch, from 220 grams/inch to 280 grams/inch, or from 240 grams/inch to 260 grams/inch. In terms of upper limits, the peel strength to break the bond between these layers may be less than 400 grams/inch, e.g., less than 360 grams/inch, less than 340 grams/inch, 320 grams/inch, less than 280 grams/inch, less than 260 grams/inch, or less than 240 grams/inch. In terms of lower limits, the peel strength to break the bond between these layers may be at least 100 grams/inch, e.g., at least 120 grams/inch, at least 140 grams/inch, at least 160 grams/inch, at least 180 grams/inch, at least 200 grams/inch, or at least 220 grams/inch. In this embodiment, the peel strength to break the bond between the heat-seal layer and the removable adhesive layer may be greater than 400 grams/inch, and the peel strength to break the bond between the facestock layer and the release coating may be greater than 400 grams/inch.

The break strength of the matrix is greater than the peel forced required strip the matrix from the bottom layer. For example, the break strength must be higher than the peel force between the matrix and the layer below the matrix, e.g., release coating or heat-seal layer. In some embodiments, the break strength of the matrix is at least 700 kg/cm$^2$ at a production speed in a range from 50 ft/min to 350 ft/min. In some aspects, the break strength of the matrix is at least 700 kg/cm$^2$ at a production speed in a range from 50 ft/min to 300 ft/min, e.g., from 75 ft/min to 275 ft/min, from 100 ft/min to 250 ft/min, from 125 ft/min to 225 ft/min, or from 150 ft/min to 200 ft/min. In one embodiment, the break strength of the matrix is at least 1000 kg/cm$^2$ at a production speed in of 100 ft/min. In one embodiment, the break strength of the matrix is at least 1200 kg/cm$^2$ at a production speed in of 250 ft/min.

The improved break strength exhibited by the matrix is important for several reasons. Such improvement facilitates conversion of the laminated label, for example by die cutting and matrix stripping methods as discussed above, by allowing the laminate construction to be processed at higher production speeds without matrix breaking and the like, thereby making the converting process more efficient. Also, such an improvement allows the laminated label constructions to be manufactured from lighter weight materials, e.g., the heat-seal layer or facestock, because of the reinforcing effect provided to the construction by coating the removable adhesive, as well as applying a release coating, thereby reducing the raw material costs associated with making the laminated label construction.

In some cases, a label formed with the specific configuration of layers described herein has an increased surface energy due to the addition of the release coating. In some cases, the surface energy of the label is in a range from 30 mJ/m$^2$ to 50 mJ/m$^2$, e.g., from 32 mJ/m$^2$ to 48 mJ/m$^2$, from 34 mJ/m$^2$ to 46 mJ/m$^2$, from 36 mJ/m$^2$ to 44 mJ/m$^2$, or from 38 mJ/m$^2$ to 42 mJ/m$^2$. In terms of lower limits, the surface energy of the label is greater than 30 mJ/m$^2$, e.g., greater than 32 mJ/m$^2$, greater than 34 mJ/m$^2$, greater than 36 mJ/m$^2$, or greater than 38 mJ/m$^2$. In terms of upper limits, the surface energy of the label is less than 50 mJ/m$^2$, e.g., less than 48 mJ/m$^2$, less than 46 mJ/m$^2$, less than 44 mJ/m$^2$, or less than 42 mJ/m$^2$. By utilizing a label configuration with the aforementioned surface energy, indicia, e.g., ink, printed on the labels wets out appropriately on the label for an improved image. In some aspects, the surface tension of the ink is at least 10 dyne lower than the surface energy of the label surface.

Container (Tray)

In some embodiments, the label lid may be applied to a container, e.g., a tray. The label lid may be heat sealed around the edges of the tray. In one embodiment, the label lid is heat sealed to the tray flange on at least one side, e.g., on all four sides. The tray may have a recessed portion and a flange. The recessed portion may define a product-receiving cavity. The flange comprises two opposing edges with the width of the tray separating the two. Preferably, the label lid extends across the cavity and is sealed and attached on at least one side, e.g., on all four sides, of the flange. After an initial opening of the lid such as by a consumer, the lid may be resealed or "closed" against the tray and retained closed by the layer of pressure sensitive adhesive.

The tray may be made of any suitable material. In some embodiments, the material of the tray is selected so that the tray is physically rigid or at least semi-rigid. The tray may, for example, be sufficiently rigid such that it is self-supporting, e.g., that the tray substantially retains its 3-dimensional shape under the influence of its own weight when placed on a flat tabletop. In some embodiments, the tray is made of a thermoplastic sheet of one or more polymer materials, and the sheet may have a single layer construction or a multi-layered construction.

In some embodiments, the tray may comprise thermoforming materials or a blend of thermoforming materials. In some embodiments, the thermoforming materials may comprise one or more of polyvinyl chloride, polyester, copolyester, recycled polyester, high impact polystyrene, polystyrene, polypropylene, copolymers of polypropylene, high density polyethylene, polybutylene terephthalate, styrene-butadiene copolymers, polyacrylonitrile copolymers, polyvinyl chloride, polycarbonate, polymethylmethacrylate, and blends or composites of the foregoing materials, including blends with other various polymeric, organic, or inorganic materials.

In some aspects, the tray may comprise additional sealant materials. In some aspects, the sealant materials may comprise polyolefins, polyethylene, copolymers of polyethylene, or ethylene vinyl acetate. In some aspects, the sealant materials may comprise polyvinylidene chloride, copolymers of polyvinylidene chloride, waxes, acrylics, and a wide variety of other materials known to those of ordinary skill in the art. Of course, in the case of food applications, the tray may comprise materials that have been approved for, or are generally accepted for, use with food products. For example, suitable commercial container/tray materials include, but are not limited to Barex products from INEOS Barex AG and Aclar products from Honeywell, as well as thermoformable and injected molded PET and PP trays from multiple industry sources.

In some embodiments, the tray may be thermoformed, molded, or otherwise shaped to provide a recessed portion and flange, the recessed portion defining a product-receiving cavity. In some cases, the label lid adhered to the tray is cut, e.g., die cut, up from the heat-seal layer side. The die cut preferably cuts through the removable adhesive layer and stops at the facestock layer. In some cases, the label lid may be cut down from the facestock layer side. The cut preferably cuts through the removable adhesive layer and stops at the heat-seal layer.

In one embodiment, a corner of the label lid is left hanging over a portion of the tray flanges, e.g., at each corner. The overhangs are left to facilitate removal of the facestock layer from the unsealed heat-seal layer. In some cases, on at least one of the corners, the unsealed facestock layer material may be pulled from the unsealed heat-seal layer either by dislodging the face corner (with the user's finger) or by providing a deadened corner formed by adding the deadener in the printing process. These features facilitate easy opening from the unsealed heat-seal layer.

In one embodiment, the lidding film is heat sealed to the tray with an overhang on one or more sides of the tray. In use, the overhang is grabbed and pulled to remove the lidding film. In this instance, the lidding film releases from the tray because the lidding film sealant is designed to be peelable. The lidding material must have enough internal strength to withstand the peel without tearing.

In some embodiments, the facestock layer is laminated to the heat-seal film and then die cut from the top of the facestock to the heat-seal layer. The "skeleton" of the die cut material may be removed during the die cutting process. In some aspects, the die cut inner label portion is long and wide enough to cover the recessed area of the tray, with the exposed sealant material now left to seal to the tray flange. In this embodiment, the amount of material required to seal through will advantageously be greatly reduced, allowing for less energy consumption in the sealing process and less tray distortion due to lower heat-sealing temperatures.

Other Additives/Primers

In one embodiment, the facestock layer may be a primed facestock layer. In some cases, the facestock layer may be treated with a primer. The primer may vary widely and many primers are known in the art. In one embodiment, the primer, e.g., a primer layer formed by the application of the primer, may comprise acrylics, olefins, terepthalates, e.g., PET, and combinations thereof.

In some embodiments, the configuration also includes an additional rigid polymeric material (a rigid polymeric layer), which may be disposed on top of the facestock material. The rigid material can be laminated to the facestock material via conventional pressure sensitive technologies or through a direct lamination process. Both reclosable and permanent adhesives can be utilized. Some examples of suitable adhesives are disclosed herein.

In some embodiments, the rigid polymeric layer can range in thickness from 1 mil to 20 mils, e.g., from 2 mils to 15 mils, from 3 mils to 12 mils, or from 5 mils to 9 mils. The rigid polymeric layer, in some cases, may comprise polymeric materials such as uniaxially oriented HDPE, biaxially oriented PET, biaxially oriented polystyrene, biaxially oriented nylon, oriented PLA, unoriented PLA, as well as cyclic olefin copolymers (COCs). One exemplary commercially available product is Primax® from Avery Dennison.

Exemplary Configurations

Figure 1B:
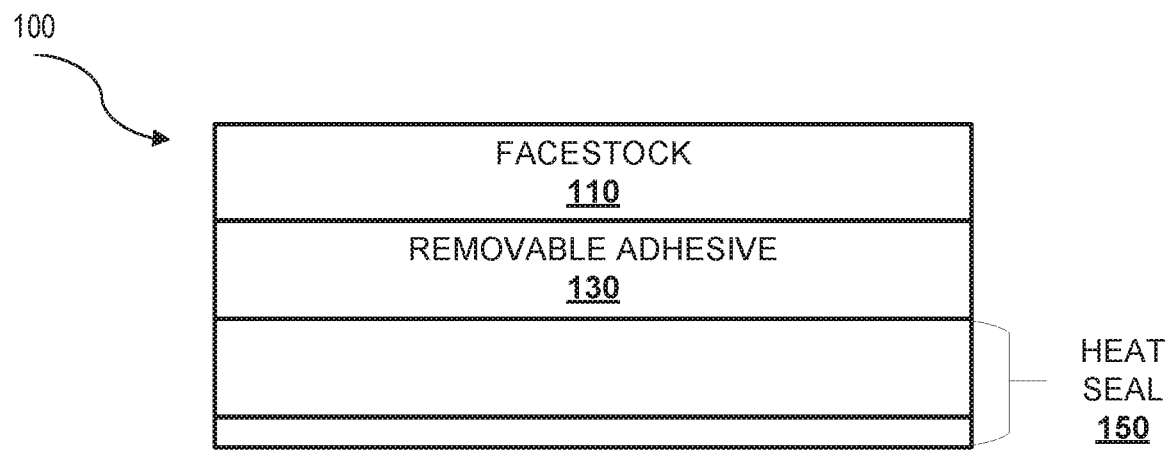

FIGS. 1A and 1B show a conventional label lid 100 configuration. As shown in FIG. 1A, the conventional label lid 100 includes a removable adhesive layer 130 and a release liner 140. The release liner 140 is removed from the removable adhesive layer 130 to expose the removable adhesive layer 130. After the release liner 140 is removed, the removable adhesive layer 130 is laminated to the heat-seal layer 150 via the exposed removable adhesive layer 130 (FIG. 1B).

The present label lid configurations described herein advantageously avoids the use of a release liner in the label configuration. The inventive label lids do not require the step of peeling the release liner to expose the removable adhesive, and avoids the use of release liners entirely.

Figure 2A:
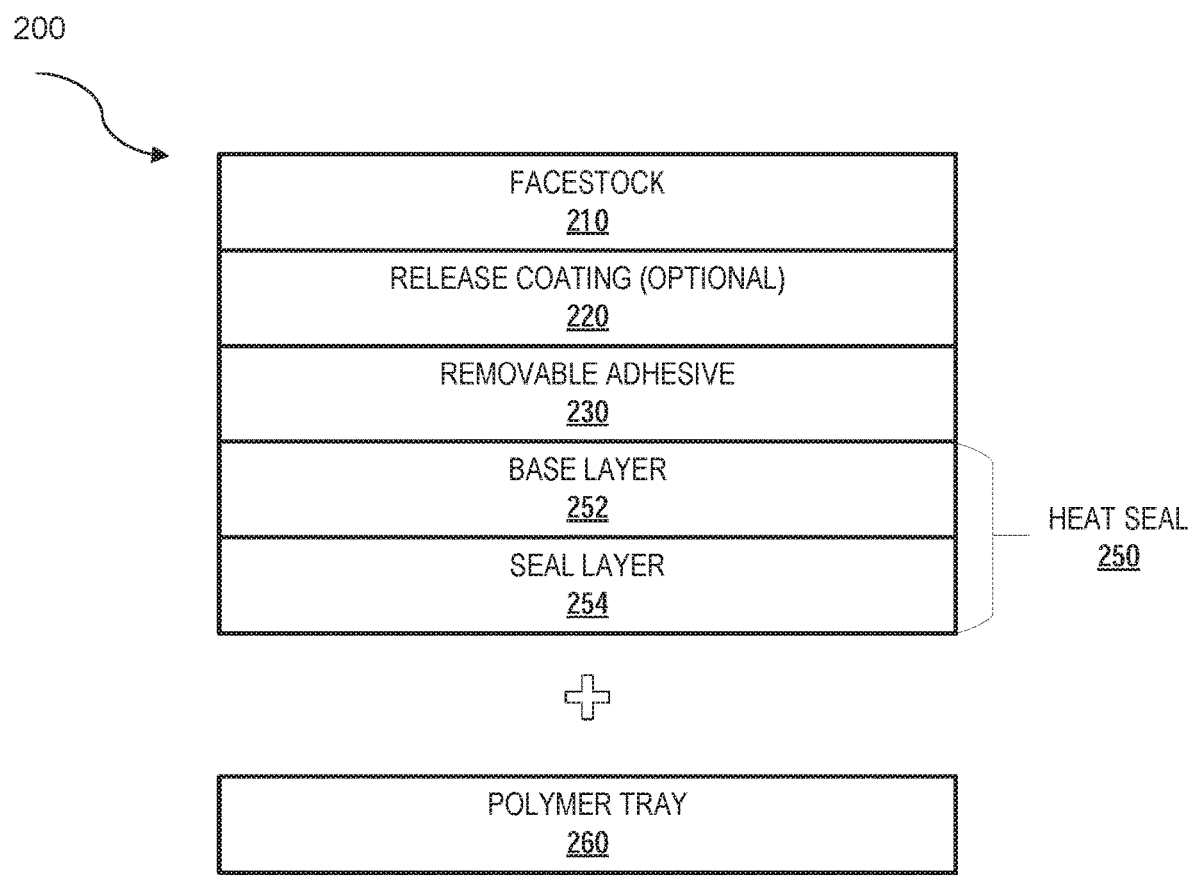
FIGS. 2A-2C show general configurations of the label lid in accordance with embodiments of the disclosure.
Figure 2B:
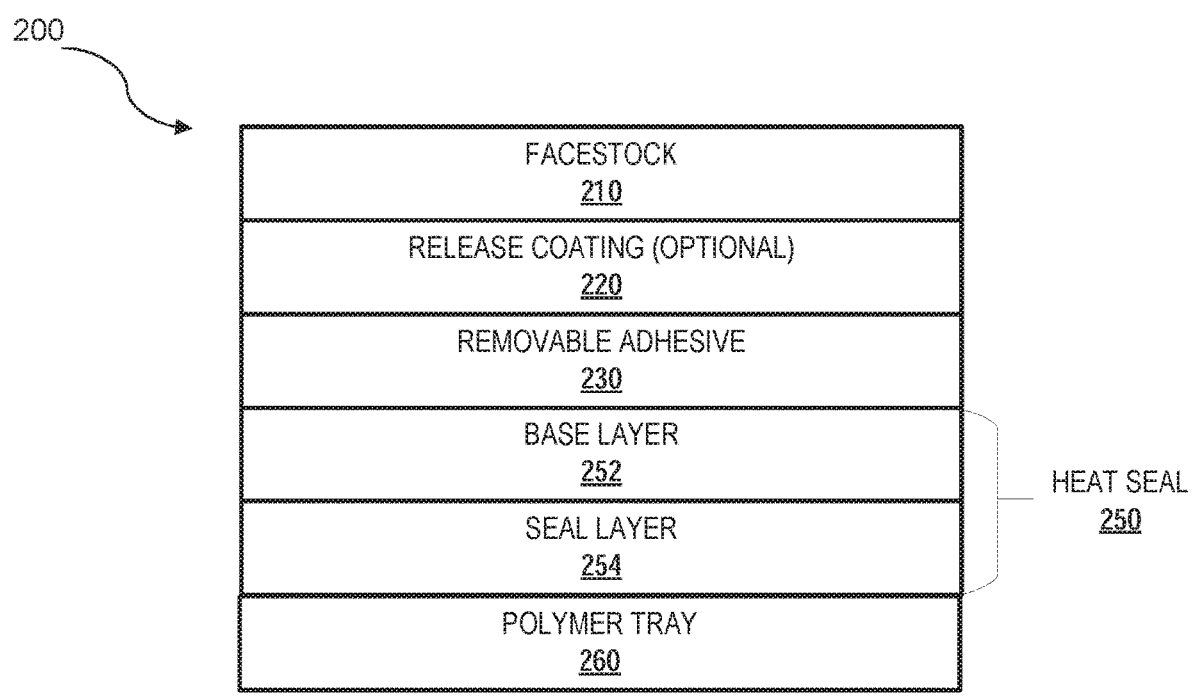

FIGS. 2A and 2B show a general configuration of the label lid in accordance with embodiments of the disclosure. FIG. 2B shows a label configuration including a facestock layer 210, an optional release coating 220, a removable adhesive layer 230, and a heat-seal layer 250. According to this embodiment, the removable adhesive layer 230 can be coated on the heat-seal layer 250, e.g., the base layer 252, and, the optional release coating 220 may be coated on the facestock layer 210. The facestock layer 210 (optionally comprising a primer) can be laminated to the coated side of the heat-seal layer 250. FIG. 2B shows the label lid 200 heat sealed via the seal layer 254 to a polymer tray 260. The respective layers have the particular compositions discussed herein.

Figure 2C:

FIG. 2C shows another configuration of the label lid 200 where the heat-seal layer 250, e.g., the base layer 252, includes the release coating 220. The removable adhesive layer 230 can be coated onto the release coating 220 or coated on the facestock layer 210. In each of these embodiments, the release coating 220 reduces the peel strength between the facestock 210 and/or heat-seal layer 250 and the removable adhesive layer 230 to enable stripping of the matrix without breaking or damaging the matrix.

Figure 3A:
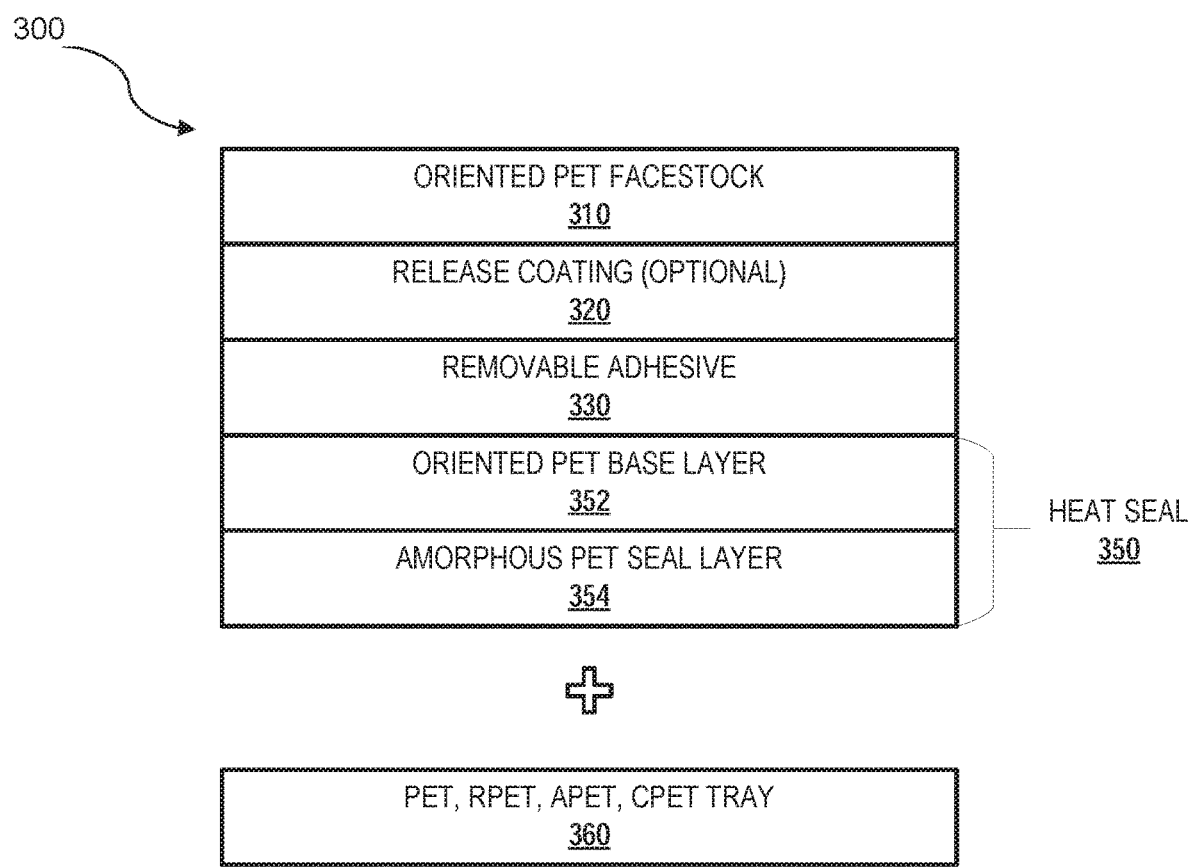
FIGS. 3A-3C show specific configurations of the label lid in accordance with embodiments of the disclosure.
Figure 3B:
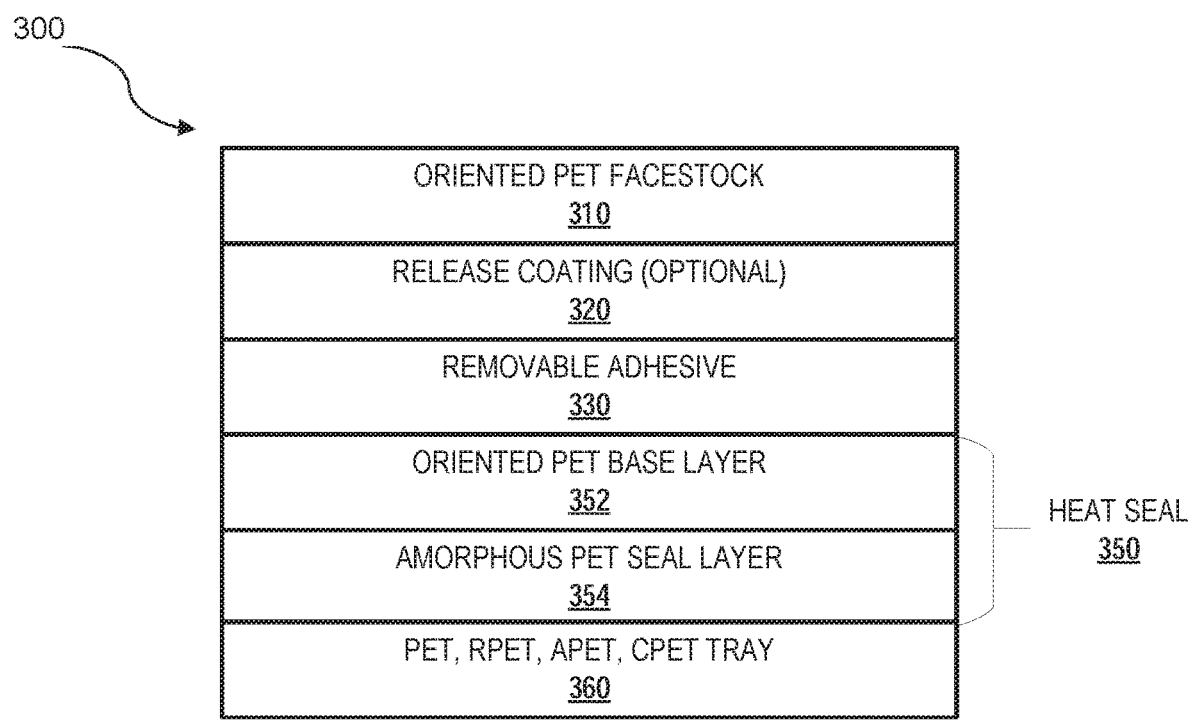
Figure 3C:
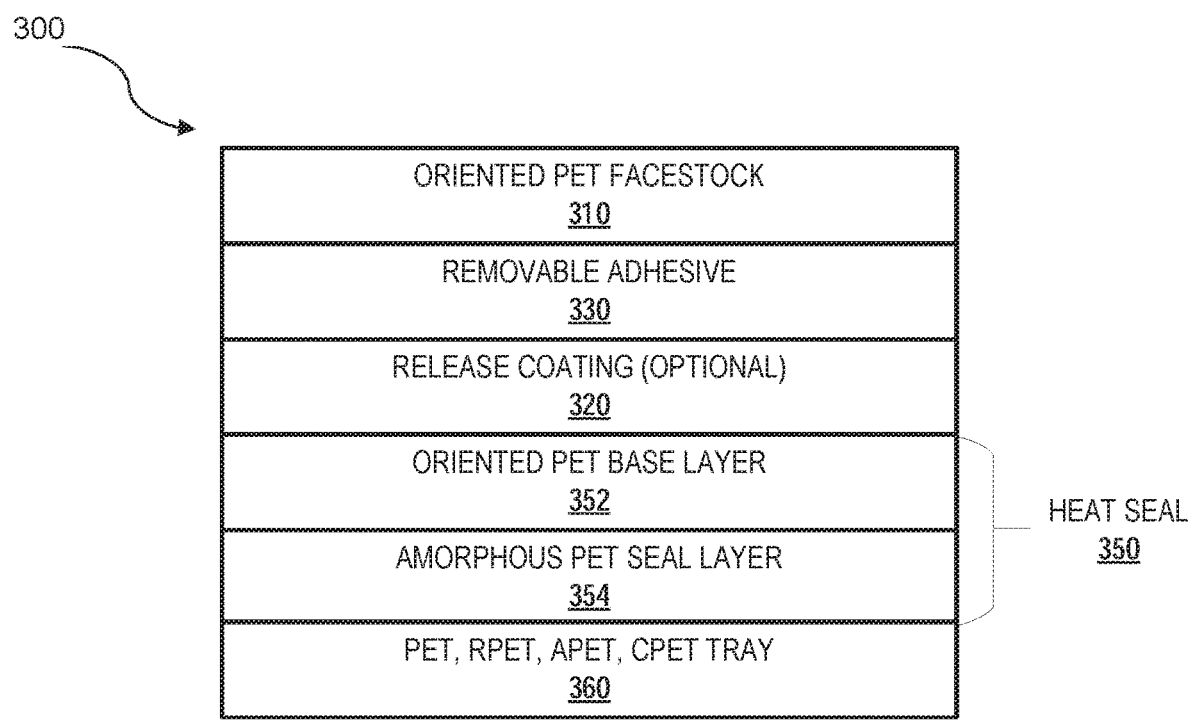

FIGS. 3A and 3B show a specific configuration of the label lid in accordance with embodiments of the disclosure. FIG. 3C shows a configuration of the label lid 300 where the release coating 320 is applied on the heat seal layer 350. In this configuration, the removable adhesive layer 330 can be coated on the release coating 320 or coated on the facestock layer 310. In each of these configurations, the facestock layer 310 comprises an oriented PET film having a thickness ranging from 12 to 50 microns. The heat-seal layer 350 comprises an oriented PET base layer 352 and an amorphous PET seal layer 354. The base layer 352 has a thickness ranging from 20 to 50 microns and the seal layer 354 has a thickness ranging from 0.2 to 25 microns.

The label lid 300 can be heat sealed to a tray 360 comprising one or more of PET, RPET, APET, or CPET. The combination of the oriented PET layer and amorphous PET layer (and optionally the specific tray materials) provide for the surprising and unexpected performance results discussed herein, e.g., peel strength and reclosure.

Figure 4A:
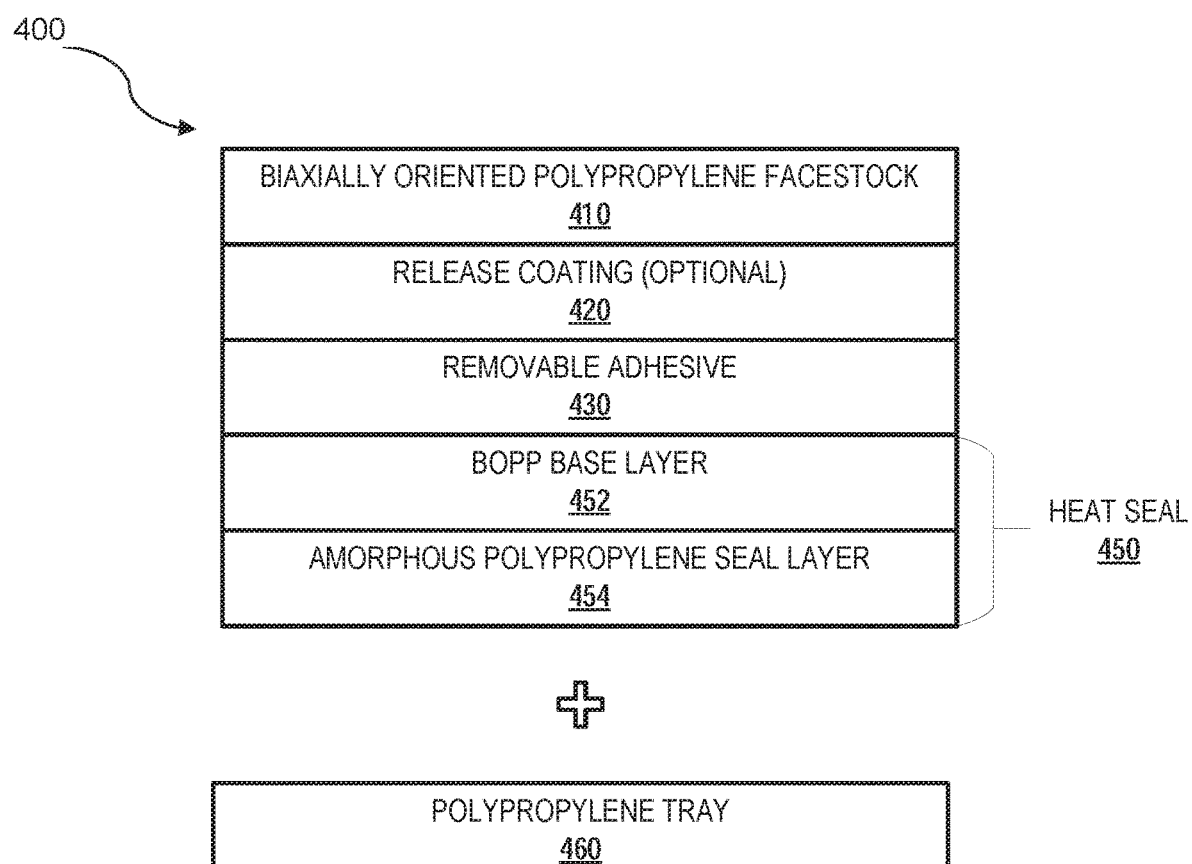
FIGS. 4A-4C show specific configurations of the label lid in accordance with embodiments of the disclosure.
Figure 4B:
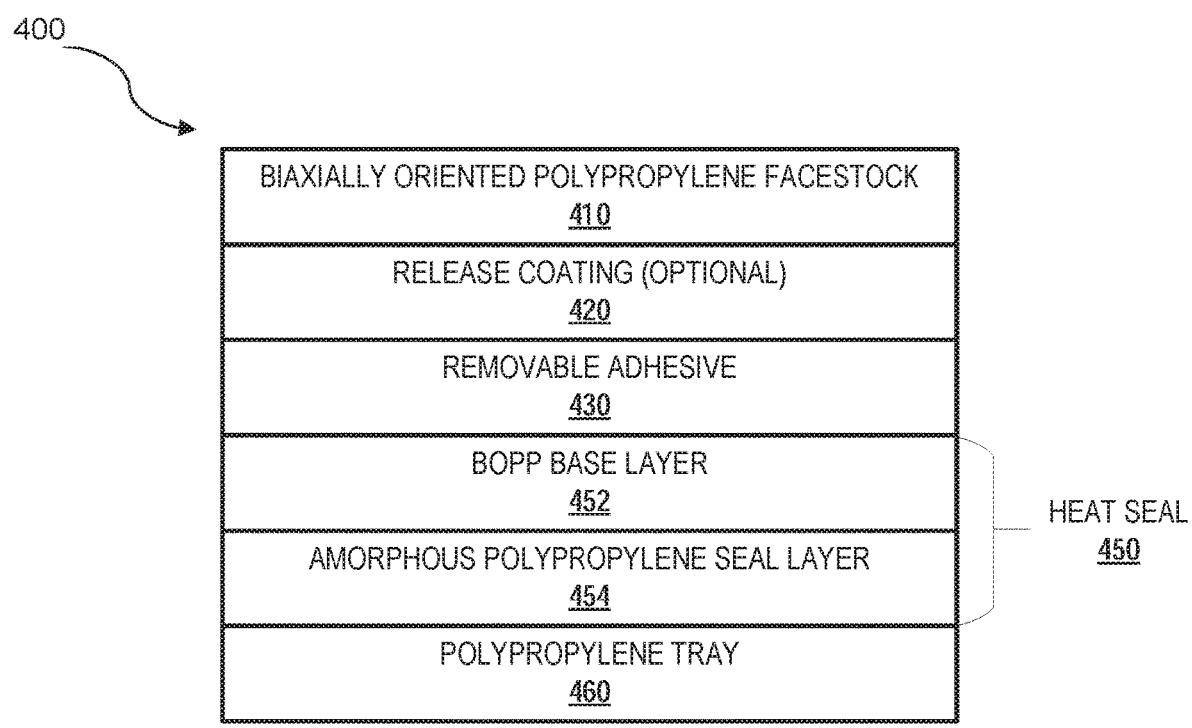
Figure 4C:
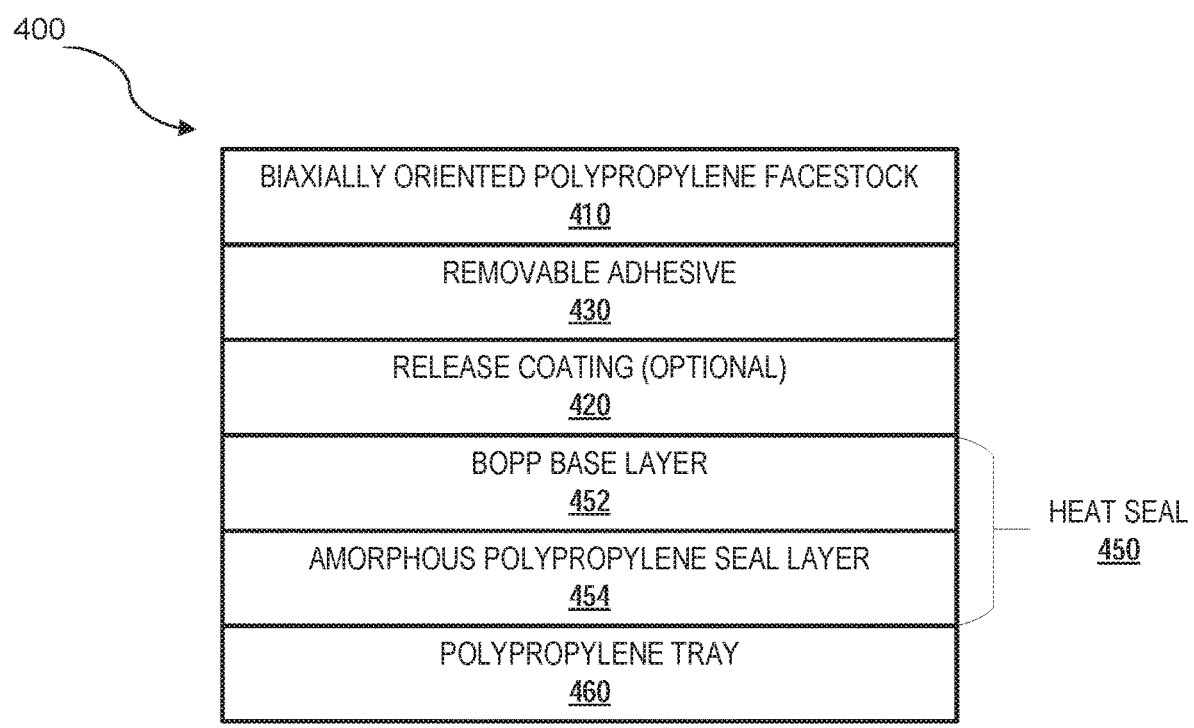

FIGS. 4A and 4B show a specific configuration of the label lid in accordance with embodiments of the disclosure. FIG. 4C shows a configuration where the release coating 420 is applied to the heat seal layer 450 and the removable adhesive layer 430 can be coated on the release coating 420 or coated on the facestock layer 410. In each of these configurations, the facestock layer 410 comprises a biaxially oriented polypropylene (BOPP) film having a thickness ranging from 15 to 50 microns. The heat-seal layer 450 comprises a BOPP base layer 452 with an amorphous polypropylene seal layer 454. The BOPP base layer 452 has a thickness ranging from 20 to 50 microns and the amorphous polypropylene seal layer 454 has a thickness ranging from 0.2 to 25 microns. The label lid 400 is heat sealed to a tray 460 comprising polypropylene. The combination of the BOPP base layer 452 and the amorphous polypropylene seal layer 454 (and optionally the specific tray material) provides for the surprising and unexpected performance results discussed herein.

Figure 5A:
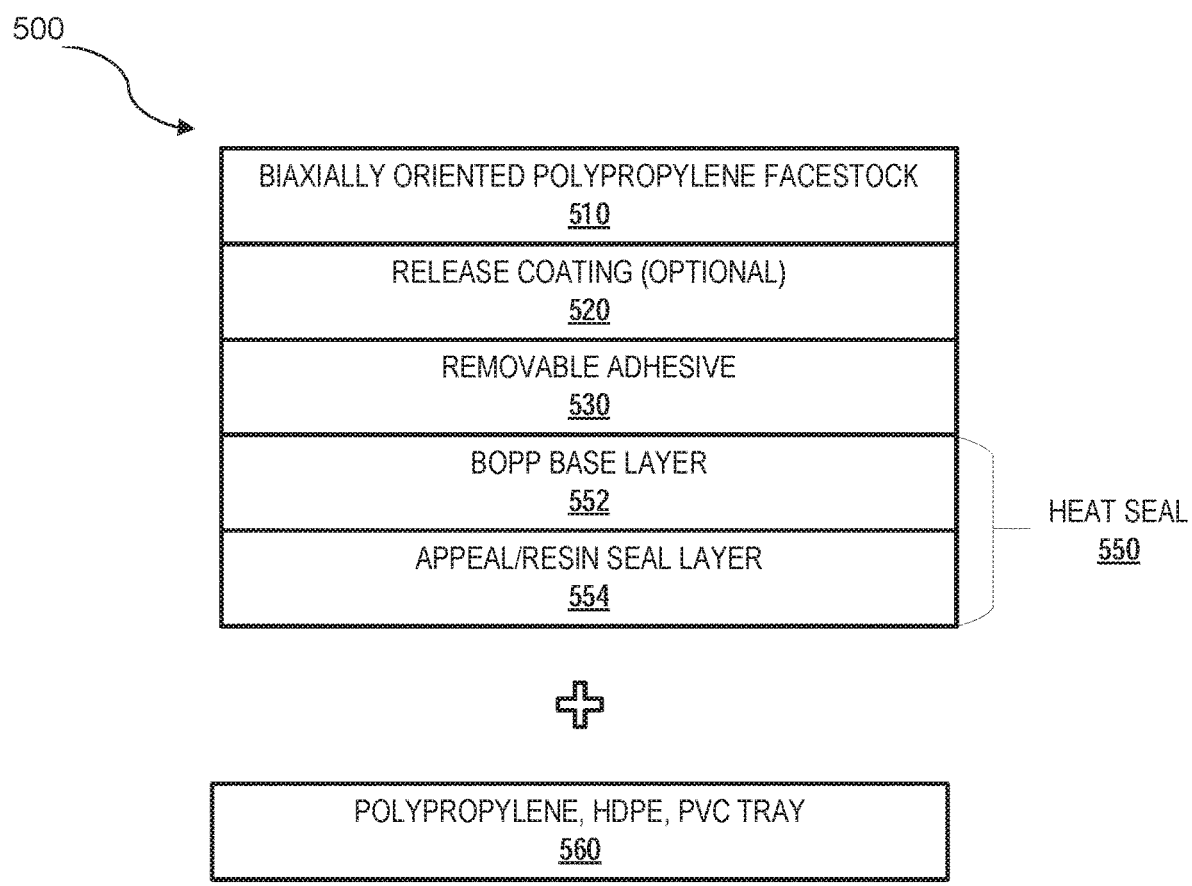
FIGS. 5A-5C show specific configurations of the label lid in accordance with embodiments of the disclosure.
Figure 5B:
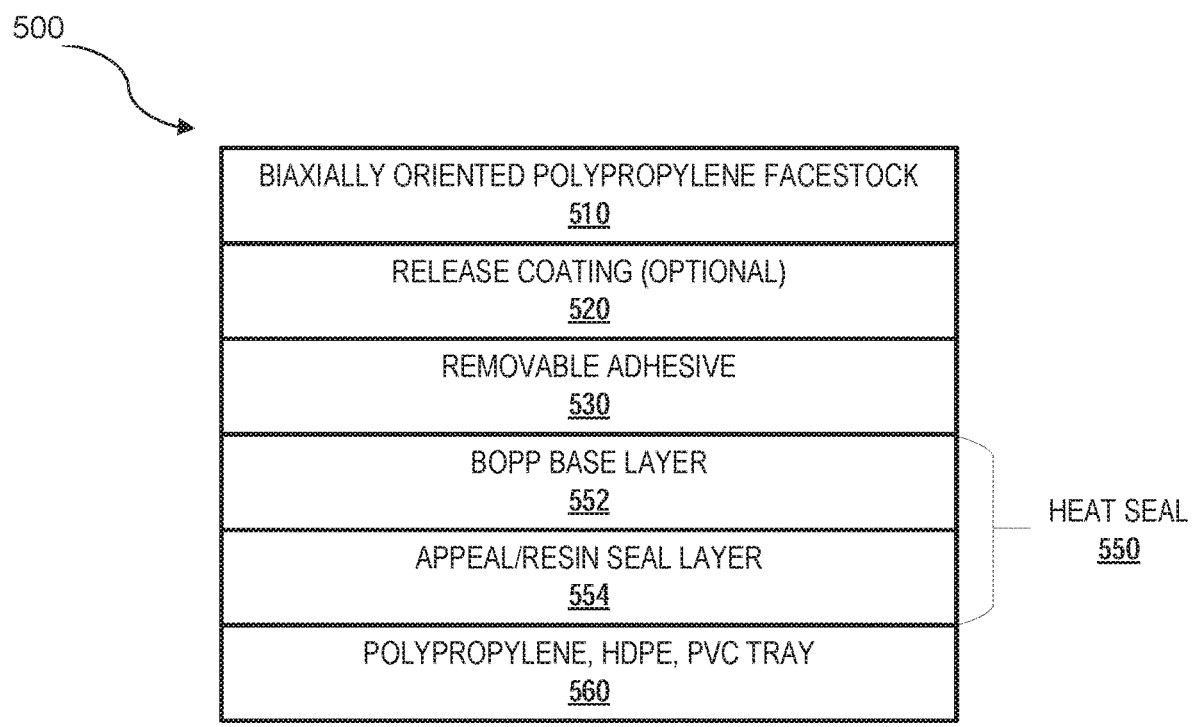
Figure 5C:
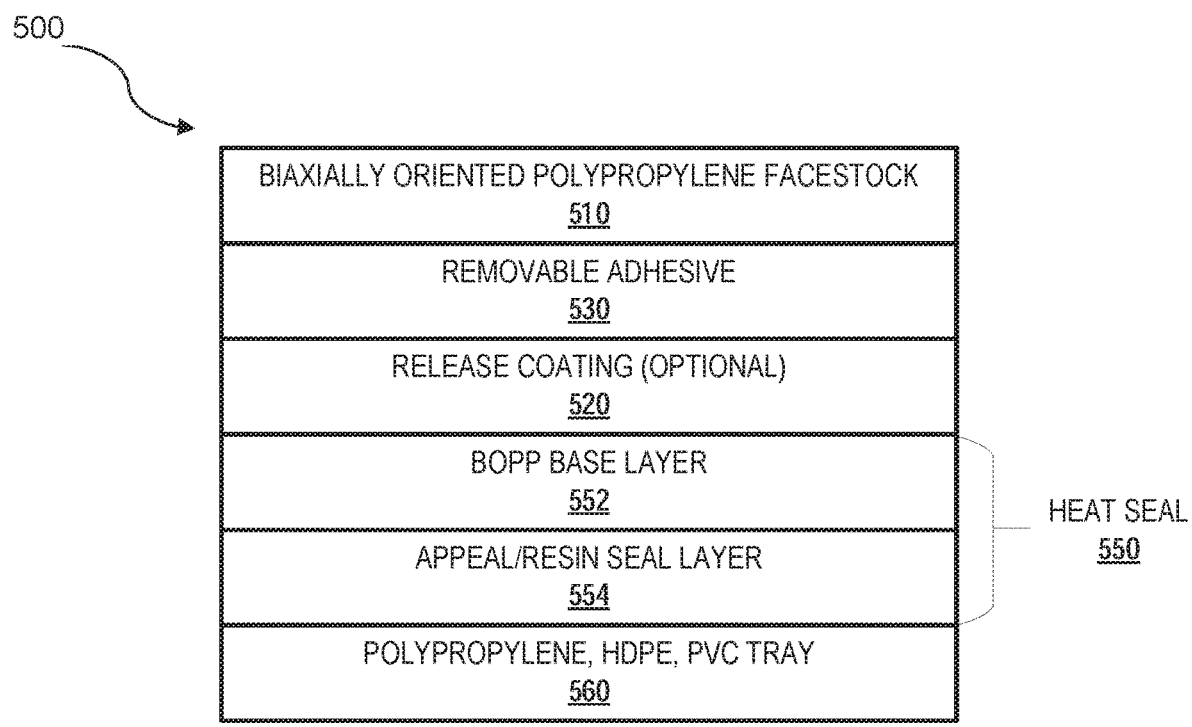

FIGS. 5A and 5B show a specific configuration of the label lid in accordance with embodiments of the disclosure. FIG. 5C shows a configuration where the release coating 520 is applied to the heat seal layer 550 and the removable adhesive layer 530 can be coated on the release coating 520 or coated on the facestock layer 510. In each of these configurations, the facestock layer 510 comprises a BOPP film having a thickness ranging from 15 to 50 microns. The heat-seal layer 550 comprises a BOPP base layer 552 and an APPEEL® 1181 resin seal layer 554. The APPEEL® 1181 resin seal layer 554 may be coated on the base layer 552. The BOPP base layer 552 has a thickness ranging from 20 to 50 microns and the APPEEL® 1181 resin seal layer 554 has a thickness ranging from 0.2 to 25 microns. FIG. 5C shows a configuration where the release coating 520 is applied to the heat seal layer 550 and the removable adhesive layer 530 can be coated on the release coating 520 or coated on the facestock layer 510. The label lid 500 is heat sealed to container 560 comprising polypropylene, high density polyethylene, and/or polyvinyl chloride. The specific combination of the heat-seal layers and the (and optionally the specific tray materials) provide for the surprising and unexpected performance results discussed herein.

FIGS. 6A and 6B show a general configuration of the label lid including indicia and an overlaminate layer in accordance with embodiments of the disclosure. FIG. 6C shows a configuration where the release coating 620 is applied to the heat seal layer 650 and the removable adhesive layer 630 can be coated on the release coating 620 or coated on the facestock layer 610. In each of these configurations, the face side of the facestock layer 610 is printed with indicia 680, e.g., desired graphics, on a portion of the label lid 600. Additionally, an optional overlaminate layer 670 can be applied to protect the indicia 680 and/or add additional stiffness to the label lid 600. The label lid 600 also comprises an optional release coating 620, a removable adhesive layer 630, and a heat-seal layer 650. The heat-seal layer 650 comprises a base layer 652 and an amorphous seal layer 654 that is heat sealed to the container 660. The removable adhesive 630 can be coated on the facestock layer 610 or the heat-seal layer 650. The label lid 600 is positioned on top of a container 660 and heat sealed to the container 660.

In some embodiments, the facestock 610 overhangs the removable adhesive layer 630 to create a tab for easy removal. The overhanging portion may be sealed, scored, and/or die cut to form the (hinged) tab.

Process for Producing

The disclosure also relates to a process for producing the label lid. In some embodiments, the process comprises the step of providing a heat-seal layer with an optional release coating on a first side, coating the removable adhesive onto the first side of the facestock layer, laminating the first side facestock layer to the first side of the heat-seal layer to form the label lid, die-cutting the label lid to form a plurality of labels surrounded by a matrix, and stripping the matrix from the plurality of labels. In some embodiments, the removable adhesive is coated onto the first side of the heat-seal layer rather than the facestock layer. In preferred embodiments, the process does not include the use of a removable adhesive layer comprising a release liner or the step of removing the release liner from the removable adhesive layer. In some aspects, the peel strength to break the bond between the heat-seal layer and the removable adhesive layer ranges from 200 grams/inch to 300 grams/inch.

In some embodiments, the process comprises the step of providing a facestock layer with an optional release coating on a first side, coating the removable adhesive onto the first side of the heat-seal, laminating the first side facestock layer to the first side of the heat-seal layer to form the label lid, die-cutting the label lid to form a plurality of labels surrounded by a matrix, and stripping the matrix from the plurality of labels. In preferred embodiments, the process does not include the use of a removable adhesive layer comprising a release liner or the step of removing the release liner from the removable adhesive layer. In some aspects, the peel strength to break the bond between the facestock layer and the removable adhesive layer ranges from 200 grams/inch to 300 grams/inch.

In embodiments in which the heat-seal layer is heated, e.g., via oven heating, the temperature of the heating should be less than the heat-seal initiation temperature. Heat seal initiation temperature is the temperature to which the polymer must be heated before it will undergo useful bonding under pressure. Therefore, heat sealing temperatures above the seal initiation temperature result in heat seals with considerable and measurable seal strength.

In one embodiment, the removable adhesive layer is coated onto a plain film, e.g., a PET film, and the coated film is laminated to the facestock. A release coating may be applied to the facestock layer before the coated film is laminated to the facestock. After the lamination, the laminated structure may then coated with an (amorphous) heat-seal layer on the back side of the non-coated plain film. The coating may be inline or offline. The materials for the layers may be as described herein. The coating can be solvent based, water based emulsion, hotmelt (extrusion coating) and UV cured process.

A process for forming a resealable container is also contemplated. The process comprises the steps of providing the label, e.g., label lid, and a container and heat sealing the label to the container to form the resealable container.

EXAMPLES

Labels were prepared having the configuration described herein. The labels of the Examples 1-4 comprised (from top to bottom) a facestock layer, an adhesive layer, a release (coating), and a heat-seal layer. In Examples 1-4, the facestock layer comprised a 50.8 micron printable BOPP and the removable adhesive comprised an acrylic emulsion pressure-sensitive adhesive, e.g., R3400 from Avery Dennison. The heat-seal layer comprised a 30 micron PET film. The release coating was coated on the heat-seal layer (non-heat seal side).

Example 5 comprised a facestock layer, an adhesive layer, a release (coating), and a PET film layer. The facestock layer comprised a 50.8 micron printable BOPP and the removable adhesive comprised an acrylic emulsion pressure-sensitive adhesive, e.g., R3400. The PET film layer had a thickness of 50.8 micron. The release coating was coated on the PET film.

For Examples 1-5, the release coating comprised blends of ACRYGEN 27 from Omnova Solutions, Inc., Chester, S.C. (Acrylic Emulsion 1) and SunCryle HP114 from Omnova Solutions, Inc., Chester, S.C. (Acrylic Emulsion 2). The blend percentages are shown in Table 1.

The labels of Examples 1-5 were tested for peel strength (90° peel strengths of the removable adhesive, tested according to PSTC-1 as described in ASTM D1000 (2010). This method measures the peeling force necessary to remove a pressure sensitive adhesive from a PET surface to which it has been applied, under specified conditions. The peel strength results are provided in Table

TABLE 1

| | Wt % of Acrylic Emulsion 1 | Wt % of Acrylic Emulsion 2 | 90° Avg. Peel (g/in) | Surface energy (mJ/m$^2$) |
|---|---|---|---|---|
| Example 1 | 65 | 35 | 169 | 34 |
| Example 2 | 75 | 25 | 207 | 40 |
| Example 3 | 80 | 20 | 222 | 40 |
| Example 4 | 85 | 15 | 265 | 45 |
| Example 5 | 90 | 10 | 283 | 46 |

As shown, it was unexpectedly found that by changing the composition of the label layers, e.g., the composition of the removable adhesive layer, a desirable peel force (release force) was achieved, e.g., ranging from 100 g/in to 400 g/in. For all of Examples 1-5, when the labels were removed/peeled, the matrix was effectively peeled without damaging either the matrix or the substrate. Thus, surprising improvements in matrix stripping were demonstrated.

In addition, the labels of Examples 1-5 were tested for surface energy. Surface energy was measured via contact angle method. The equipment used to measure surface energy was KRUSS DSA 25E drop shape analyzer equipped with KRUSS Advance software. The contact angle was determined using software that uses elliptical geometric fitting. Surface energy was calculated from contact angle using the OWRK or Fowkes Equation, which requires an equilibrium contact angle from both a polar and a dispersed fluid. Water was used as the polar fluid and diiodomethane was used as the dispersed fluid. Samples were prepared by cutting a strip of material in the cross direction in an area that appeared to have very little handling/wrinkling. Dry air was used to blow off any dust/debris on the surface. Four contact angles of four drops of each fluid were measured on each sample.

The surface energy results are shown in Table 1. Beneficially, the surface energies of Examples 1-5 were surprisingly high, e.g., ranging from 30 mJ/m$^2$ to 50 mJ/m$^2$. These improved surface energies led to improved ink wet out and printing on the release surface, which in turn provided for significant improvements in the label images.

EMBODIMENTS

The following embodiments, inter alia, are contemplated. All combinations of features and embodiments are contemplated.

Embodiment 1

A process for producing a label lid, the process comprising the steps of: (a) providing a facestock layer; (b) coating a removable adhesive layer to a first side of the facestock layer; and (c) laminating the first side of the facestock layer to a first side of a heat-seal layer; wherein the removable adhesive layer does not comprise a release liner.

Embodiment 2

An embodiment of embodiment 1, further comprising applying a release coating to the first side of heat-seal layer before laminating step (c).

Embodiment 3

An embodiment of any of embodiments 1 or 2, wherein the peel strength to break the bond between the heat-seal layer and the removable adhesive layer ranges from 200 grams/inch to 300 grams/inch.

Embodiment 4

An embodiment of any of embodiments 1-3, wherein the peel strength to break the bond between the facestock layer and the removable adhesive layer is greater than the peel strength to break the bond between the heat-seal layer and the removable adhesive layer.

Embodiment 5

An embodiment of any of embodiments 2-4, wherein the peel strength to break the bond between the heat-seal layer and the release coating is greater than the peel strength to break the bond between the heat-seal layer and the removable adhesive layer.

Embodiment 6

An embodiment of any of embodiments 2-5, wherein the release coating comprises one or more of silicone, fluoropolymer, polyethylene, polyolefin, polyester, polyvinyl chloride, polyvinyl fluoride, polyvinylidene difluoride, polyvinyl acetate/acrylate, modified polyurethane, polyester, wax, acrylate, acrylic, modified starch, or combinations thereof.

Embodiment 7

An embodiment of any of embodiments 2-6, wherein the coat weight of the release coating in the label ranges from 0.4 g/m$^2$ to 2 g/m$^2$.

Embodiment 8

An embodiment of any of embodiments 1-7, wherein the facestock layer comprises one or more of polyester, oriented nylon, biaxially oriented polypropylene, biaxially oriented polyethylene, polyethylene terephthalate, oriented polyethylene terephthalate, uniaxially oriented high density polyethylene, treated polyolefin, oriented polystyrene, cellophane, polylactic acid, or combinations thereof.

Embodiment 9

An embodiment of any of embodiments 2-8, wherein the facestock layer comprises one or more of BOPP or PET, wherein the coat weight of the release coating in the label ranges from 0.4 g/m$^2$ to 2 g/m$^2$, and wherein the peel strength to break the bond between the heat-seal layer and the removable adhesive layer ranges from 200 grams/inch to 300 grams/inch.

Embodiment 10

An embodiment of any of embodiments 2-9, wherein the peel strength to break the bond between the heat-seal layer and the removable adhesive layer ranges from 200 grams/inch to 300 grams/inch, wherein the peel strength to break the bond between the facestock layer and the removable adhesive layer is greater than 400 grams/inch, wherein the peel strength to break the bond between the heat-seal layer and the release coating is greater than 400 grams/inch.

Embodiment 11

An embodiment of any of embodiments 1-10, wherein the break strength of the matrix is at least 700 kg/cm$^2$ at a production speed in a range of 50 ft/min to 300 ft/min.

Embodiment 12

A process for producing a label, the process comprising the steps of: (a) providing a heat-seal layer; (b) coating a removable adhesive layer to a first side of the heat-seal layer; and (c) laminating the first side of the heat-seal layer to a first side of a facestock layer; wherein the removable adhesive layer does not comprise a release liner.

Embodiment 13

An embodiment of embodiments 12, further comprising applying a release coating to the first side of facestock layer before laminating step (c).

Embodiment 14

An embodiment of embodiment 13, wherein the peel strength to break the bond between the facestock layer and the removable adhesive layer ranges from 200 grams/inch to 300 grams/inch, wherein the peel strength to break the bond between the heat-seal layer and the removable adhesive layer is greater than 400 grams/inch, wherein the peel strength to break the bond between the facestock layer and the release coating is greater than 400 grams/inch.

Embodiment 15

An embodiment of embodiment 12, further comprising applying a release coating to the first side of heat-seal layer before coating step (b).

Embodiment 16

An embodiment of embodiment 15, wherein the peel strength to break the bond between the heat-seal layer and the removable adhesive layer ranges from 200 grams/inch to 300 grams/inch, wherein the peel strength to break the bond between the facestock layer and the removable adhesive layer is greater than 400 grams/inch, wherein the peel strength to break the bond between the heat-seal layer and the release coating is greater than 400 grams/inch.

Embodiment 17

An embodiment of any of embodiments 12-15, wherein the release coating is selected from the group comprising silicone, fluoropolymer, polyethylene, polyolefin, polyester, polyvinyl chloride, polyvinyl fluoride, polyvinylidene difluoride, polyvinyl acetate/acrylate, modified polyurethane, polyester, wax, acrylate, acrylic, modified starch, or combinations thereof.

Embodiment 18

An embodiment of any of embodiments 12-17, wherein the coat weight of the release coating in the label ranges from 0.4 g/m$^2$ to 2 g/m$^2$.

Embodiment 19

An embodiment of any of embodiments 12-18, wherein the facestock layer comprises one or more of polyester, oriented nylon, biaxially oriented polypropylene, biaxially oriented polyethylene, polyethylene terephthalate, oriented polyethylene terephthalate, uniaxially oriented high density polyethylene, treated polyolefin, oriented polystyrene, cellophane, polylactic acid, or combinations thereof.

Embodiment 20

An embodiment of any of embodiments 12-19, wherein the facestock layer comprises one or more of BOPP or PET, and wherein the coat weight of the release coating in the label ranges from 0.4 g/m² to 2 g/m².

Embodiment 21

An embodiment of any of embodiments 12-20, wherein the break strength of the matrix is at least 700 kg/cm² at a production speed in a range from 50 ft/min to 300 ft/min.

Embodiment 22

A label lid comprising: a heat-seal layer; a facestock layer; and a removable adhesive layer between the heat-seal layer and the facestock layer, wherein the removable adhesive layer does not comprise a release liner.

Embodiment 23

An embodiment of embodiment 22, further comprising a release coating sandwiched between the heat-seal layer and the removable adhesive layer.

Embodiment 24

An embodiment of embodiment 22, further comprising a release coating sandwiched between the facestock layer and the removable adhesive layer.

Embodiment 25

An embodiment of any of embodiments 22-24, wherein the heat-seal layer comprises a base layer and a seal layer, wherein the seal layer comprises an amorphous material.

Embodiment 26

An embodiment of embodiment 25, wherein the thickness of the seal layer ranges from 0.1 micron to 30 microns and the thickness of the base layer ranges from 2 microns to 50 microns.

Embodiment 27

An embodiment of any of embodiments 23-26, wherein the peel strength to break the bond between the heat-seal layer and the removable adhesive layer ranges from 200 grams/inch to 300 grams/inch, wherein the peel strength to break the bond between the facestock layer and the removable adhesive layer is greater than 400 grams/inch, wherein the peel strength to break the bond between the heat-seal layer and the release coating is greater than 400 grams/inch.

Embodiment 28

An embodiment of any of embodiments 23-26, wherein the peel strength to break the bond between the facestock layer and the removable adhesive layer ranges from 200 grams/inch to 300 grams/inch, wherein the peel strength to break the bond between the heat-seal layer and the removable adhesive layer is greater than 400 grams/inch, wherein the peel strength to break the bond between the facestock layer and the release coating is greater than 400 grams/inch.

Embodiment 29

An embodiment of any of embodiments 23-28, wherein the facestock layer comprises polyester having a thickness in a range from 20 µm to 50 µm, wherein the heat-seal layer comprises polyester having a thickness in a range from 10 µm to 40 µm, wherein the removable adhesive layer is a pressure sensitive adhesive having a thickness in a range from 10 µm to 40 µm, wherein the release coating has a thickness in a range from 0.5 µm to 2 µm.

Embodiment 30

A process for producing a label, the process comprising the steps of: (a) providing a facestock layer; (b) providing a heat-seal layer having a release coating on a first side; (c) coating a removable adhesive layer to the first side of the heat-seal layer; (d) laminating the first side of the heat-seal layer to the first side of a facestock layer; (e) die-cutting the label lid to form a plurality of labels surrounded by a matrix; and (f) stripping the matrix from the plurality of labels, wherein the removable adhesive layer does not comprise a release liner.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A label lid comprising:
    a heat-seal layer;
    a facestock layer having a first side and a second side, the first side printed with indicia; and
    a removable adhesive layer between the heat-seal layer and the facestock layer,
    a release coating sandwiched between the facestock layer and the removable adhesive layer, the release coating in direct contact with the second side of the facestock layer, and
    an overlaminate layer covering the indicia,
    wherein the removable adhesive layer does not comprise a release liner, and
    wherein the peel strength to break the bond between the facestock layer and the removable adhesive layer ranges from 200 grams/inch to 300 grams/inch, wherein the peel strength to break the bond between the heat-seal layer and the removable adhesive layer is greater than 400 grams/inch, wherein the peel strength to break the bond between the facestock layer and the release coating is greater than 400 grams/inch.

2. The label lid of claim 1, wherein the heat-seal layer comprises a base layer and a seal layer, the base layer comprises one or more of oriented PET or biaxially oriented polypropylene (BOPP) and the seal layer comprises one or more of amorphous PET, amorphous polypropylene, and peelable sealing resins.

3. The label lid of claim 2, wherein the thickness of the seal layer ranges from 0.1 micron to 30 microns.

4. The label lid of claim 1, wherein the facestock layer comprises polyester having a thickness in a range from 20 µm to 50 µm, wherein the heat-seal layer comprises polyester having a thickness in a range from 10 µm to 40 µm, wherein the removable adhesive layer is a pressure sensitive adhesive having a thickness in a range from 10 µm to 40 µm, wherein the release coating has a thickness in a range from 0.5 µm to 2 µm.

5. The label lid of claim 1, wherein the removable adhesive comprises an acrylic emulsion pressure sensitive adhesive.

6. The label lid of claim 1, wherein the facestock layer and the heat-seal layer comprise different materials.

7. The label lid of claim 2, wherein the thickness of the base layer ranges from 2 microns to 50 microns.

8. The label lid of claim 2, wherein the seal layer comprises an amorphous material.

9. A label lid comprising:
a heat-seal layer;
a facestock layer having a first side and a second side, the first side printed with indicia;
a removable adhesive layer between the heat-seal layer and the facestock layer, and
a release coating sandwiched between the facestock layer and the removable adhesive layer, the release coating in direct contact with the second side of the facestock layer,
wherein the heat-seal layer comprises one or more of biaxially oriented polypropylene (BOPP), amorphous polypropylene, and peelable sealing resins,
wherein the heat-seal layer further comprises an ethylene/unsaturated ester copolymer or derivative thereof, and
wherein the ethylene/unsaturated ester copolymer or derivative thereof comprises ethylene/vinyl acetate copolymer.

10. The label lid of claim 9, wherein the facestock layer and the heat-seal layer comprise different materials.

11. The label lid of claim 9, wherein the release coating is selected from the group comprising silicone, fluoropolymer, polyethylene, polyolefin, polyester, polyvinyl chloride, polyvinyl fluoride, polyvinylidene difluoride, polyvinyl acetate/acrylate, modified polyurethane, polyester, wax, acrylate, acrylic, modified starch, or combinations thereof.

12. The label lid of claim 9, wherein the coat weight of the release coating in the label ranges from 0.4 $g/m^2$ to 2 $g/m^2$.

13. The label lid of claim 9, wherein the removable adhesive layer does not comprise a release liner attached directly to it.

14. The label of claim 9, further comprising an overlaminate layer covering the indicia.

15. A label comprising:
a heat-seal layer;
a facestock layer having a first side and a second side, the first side printed with indicia, wherein the facestock layer comprises one or more of polyester, oriented nylon, biaxially oriented polypropylene, biaxially oriented polyethylene, polyethylene terephthalate, oriented polyethylene terephthalate, uniaxially oriented high density polyethylene, treated polyolefin, oriented polystyrene, cellophane, polylactic acid, or combinations thereof;
a removable adhesive layer between the heat-seal layer and the facestock layer,
a release coating sandwiched between the facestock layer and the removable adhesive layer, the release coating in direct contact with the second side of the facestock layer, and
a release coating sandwiched between the heat-seal layer and the removable adhesive layer.

16. The label of claim 15, wherein the coat weight of each release coating in the label ranges from 0.4 $g/m^2$ to 2 $g/m^2$.

17. The label of claim 15, further comprising an overlaminate layer covering the indicia.

* * * * *